United States Patent [19]

Morrison et al.

[11] 4,285,004

[45] Aug. 18, 1981

[54] TOTAL RASTER ERROR CORRECTION APPARATUS AND METHOD FOR THE AUTOMATIC SET UP OF TELEVISION CAMERAS AND THE LIKE

[75] Inventors: Eric F. Morrison, Redwood City; Anthony E. Zank, Simi Valley, both of Calif.

[73] Assignee: Ampex Corporation, Redwood City, Calif.

[21] Appl. No.: 124,370

[22] Filed: Feb. 25, 1980

[51] Int. Cl.³ .......................... H04N 9/04; H04N 9/62
[52] U.S. Cl. ......................................... 358/10; 358/41; 358/163; 358/164; 358/185; 358/210; 358/51
[58] Field of Search ....................... 358/10, 51, 41, 50, 358/210, 163, 164, 185

[56] References Cited
U.S. PATENT DOCUMENTS 4,158,208  6/1979  Dischert .................................. 358/10

Primary Examiner—Robert L. Richardson
Attorney, Agent, or Firm—Robert G. Clay; George B. Almeida

[57] ABSTRACT

A total raster error measurement and correction circuitry, using digital memory means in the camera head for the storage of correction data, corrects spatial scan, shading, etc., errors in a television picture in two dimensions. The basic spatial error correction circuit effectively synthesizes horizontal rate waveforms on a number of discrete lines of the vertical scan. On all scanned lines between discrete lines, a linear approximation between the two discrete waveforms is made to form a vertically continuous waveform. Black and white shading errors are measured by comparing the black and white video levels against respective selected black and white D.C. levels with and without a cap on the camera lens. Gamma correction is provided by comparing the peak black and white levels to derive any gray level errors. The total raster error correction data are retrieved from memory and are applied to given image pickup sensors and corresponding video processing circuits in the camera head system during real time operation.

39 Claims, 46 Drawing Figures

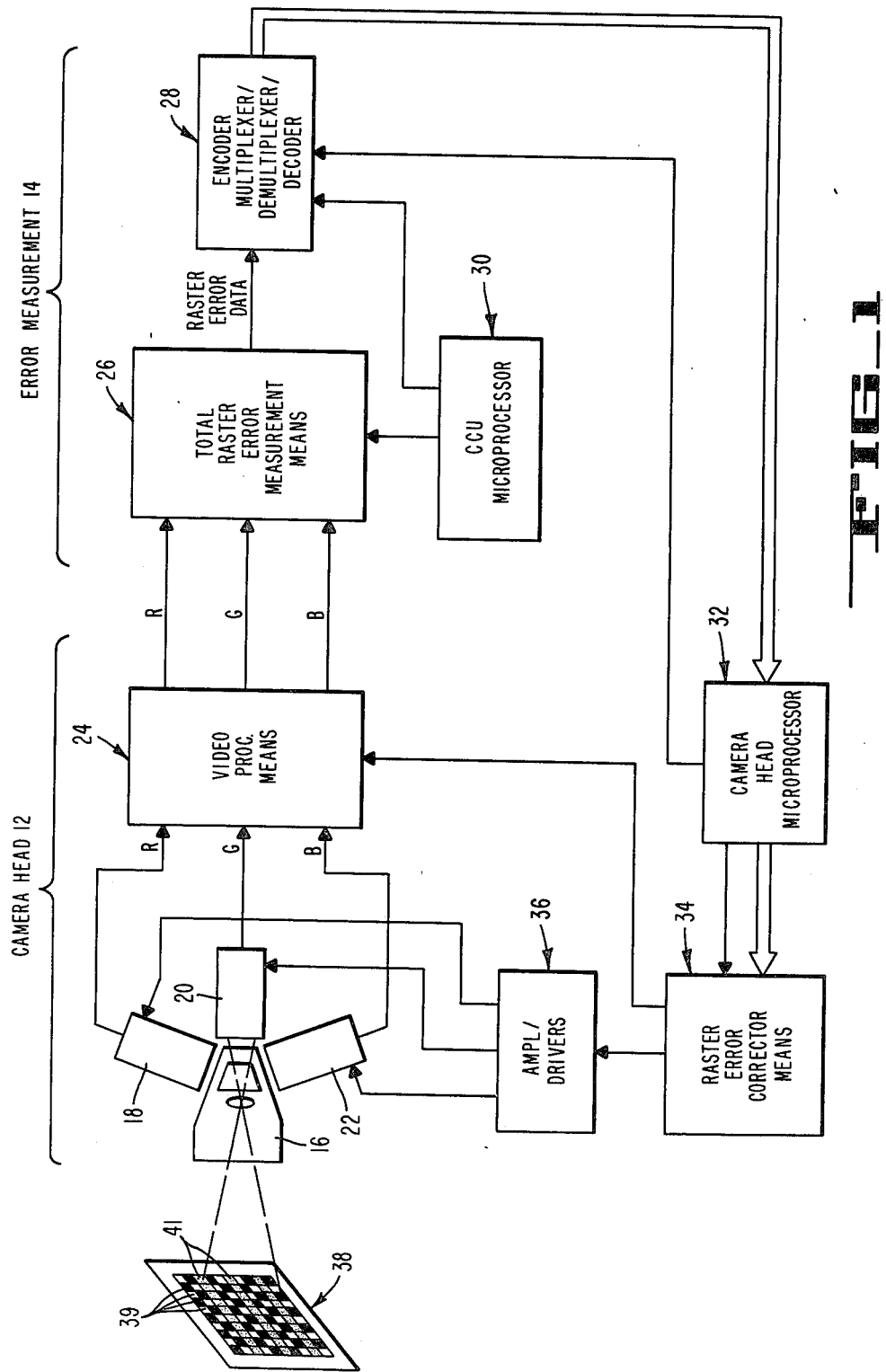
FIG_1

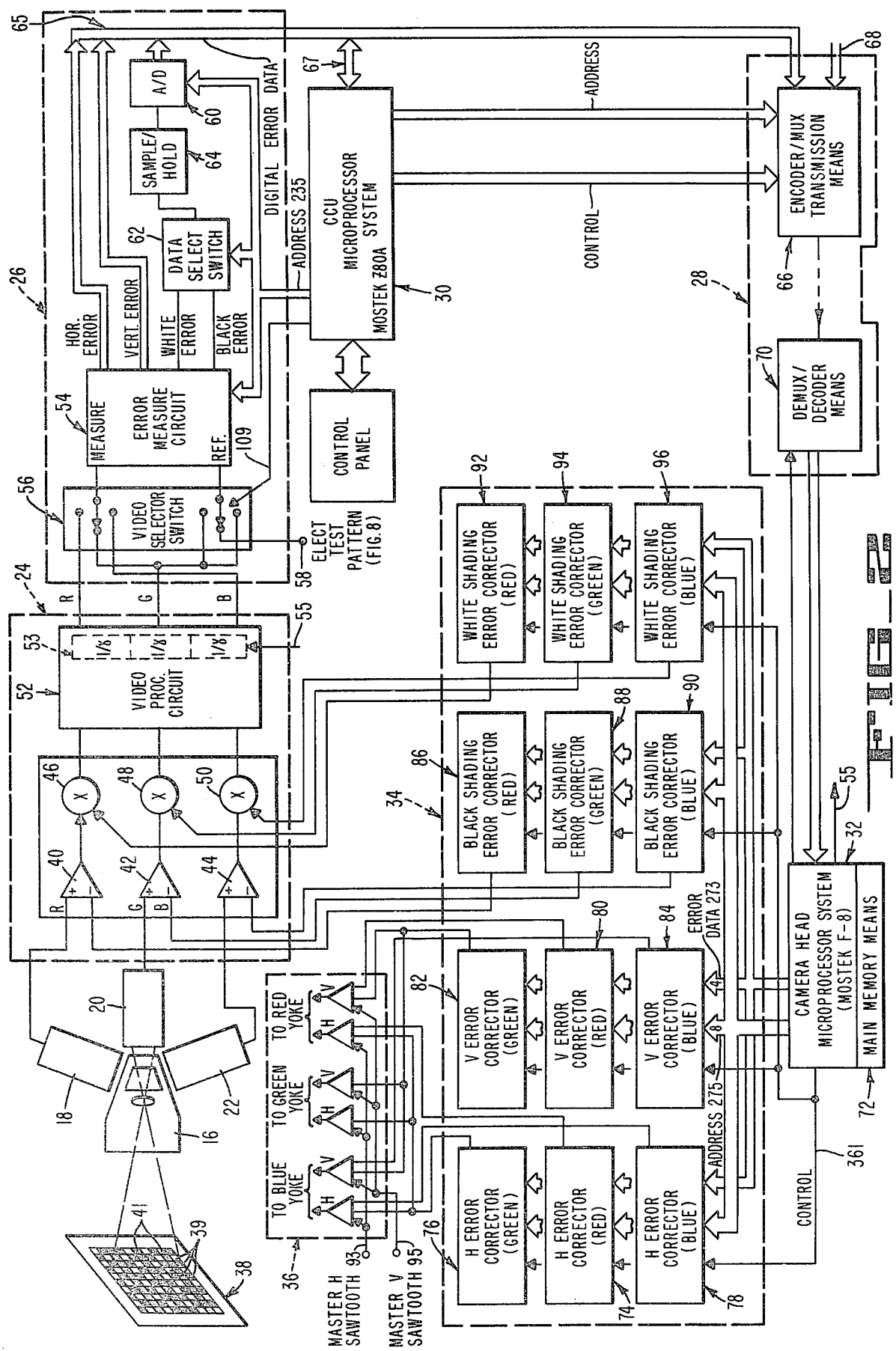

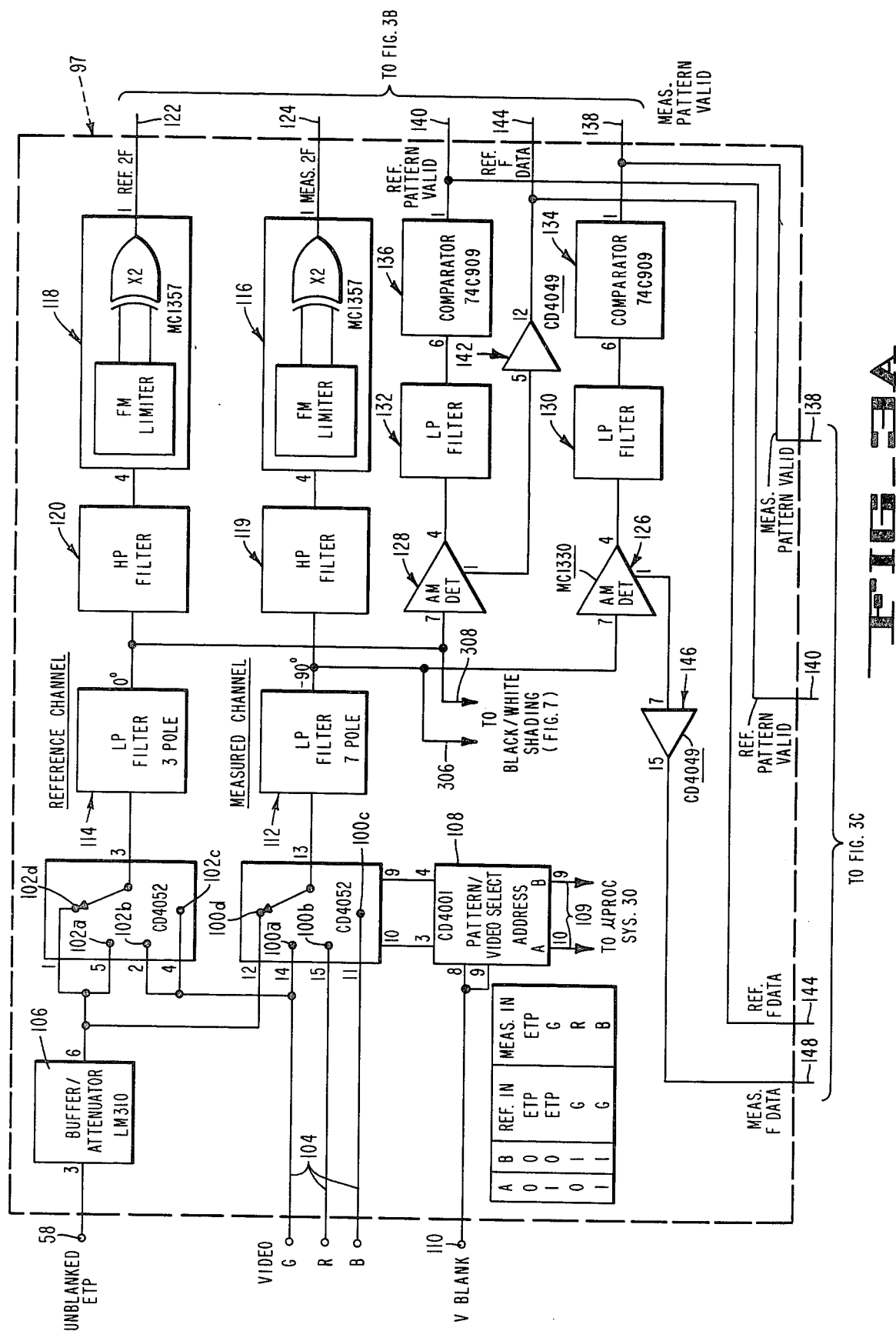

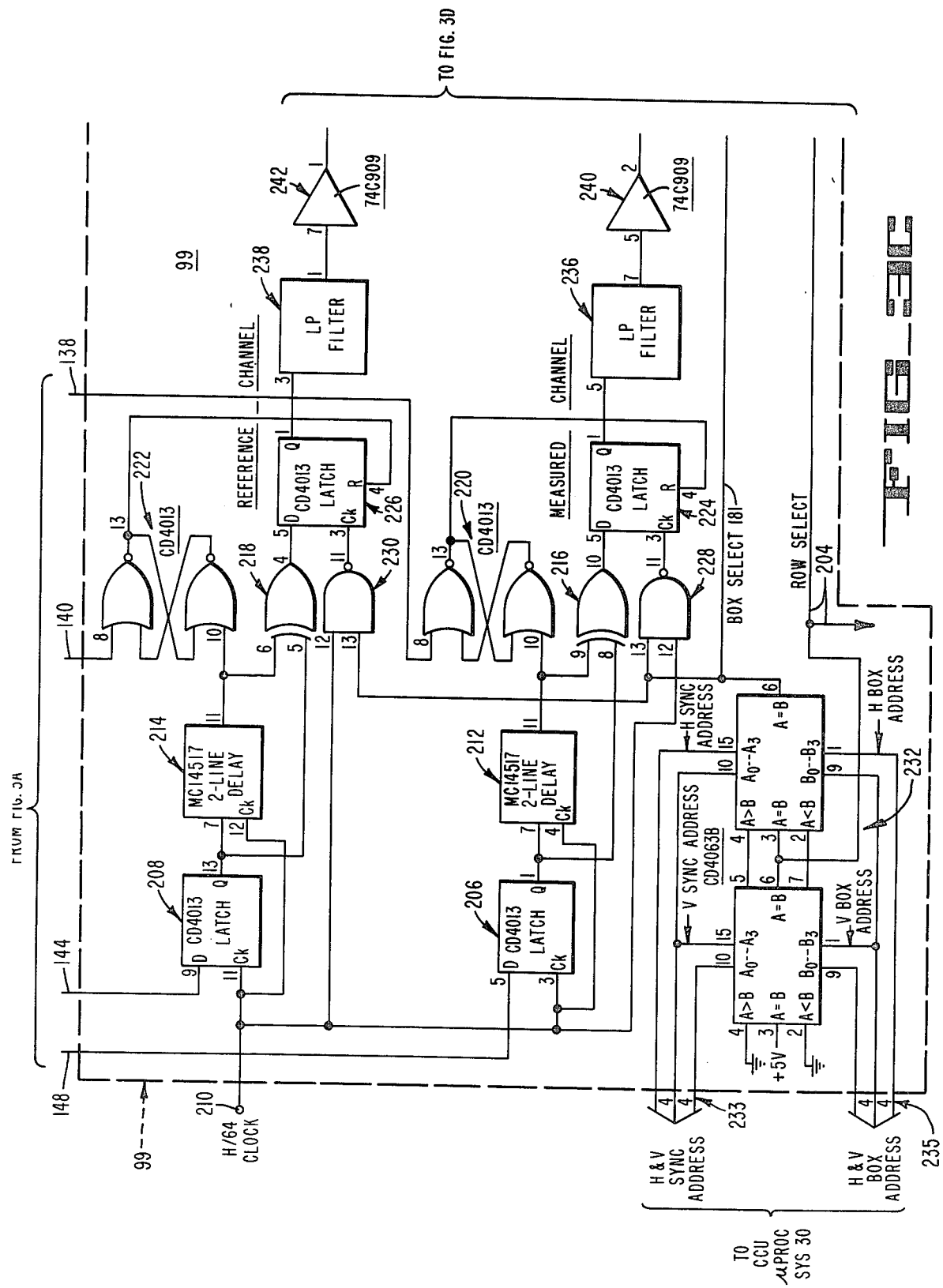

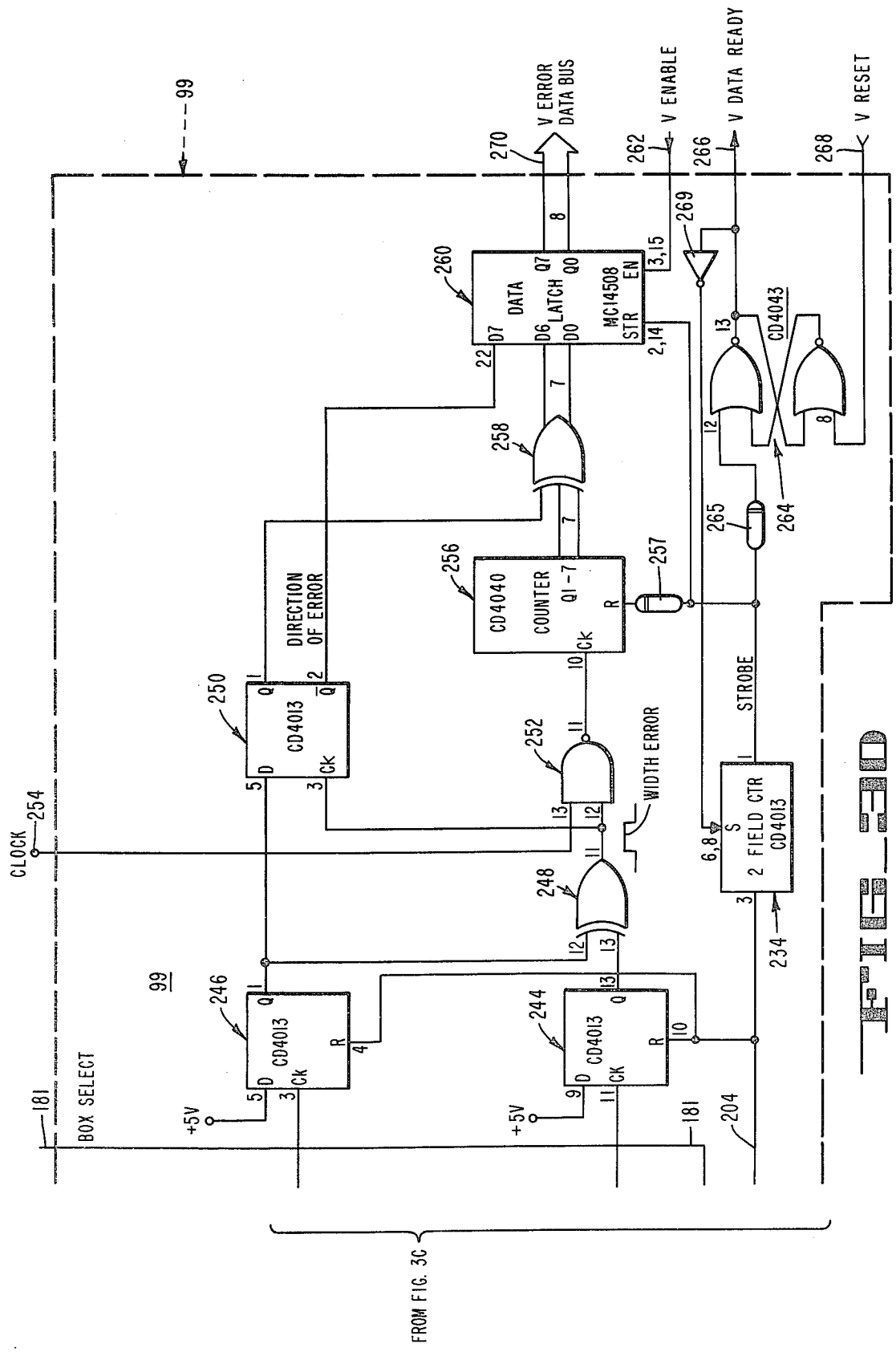

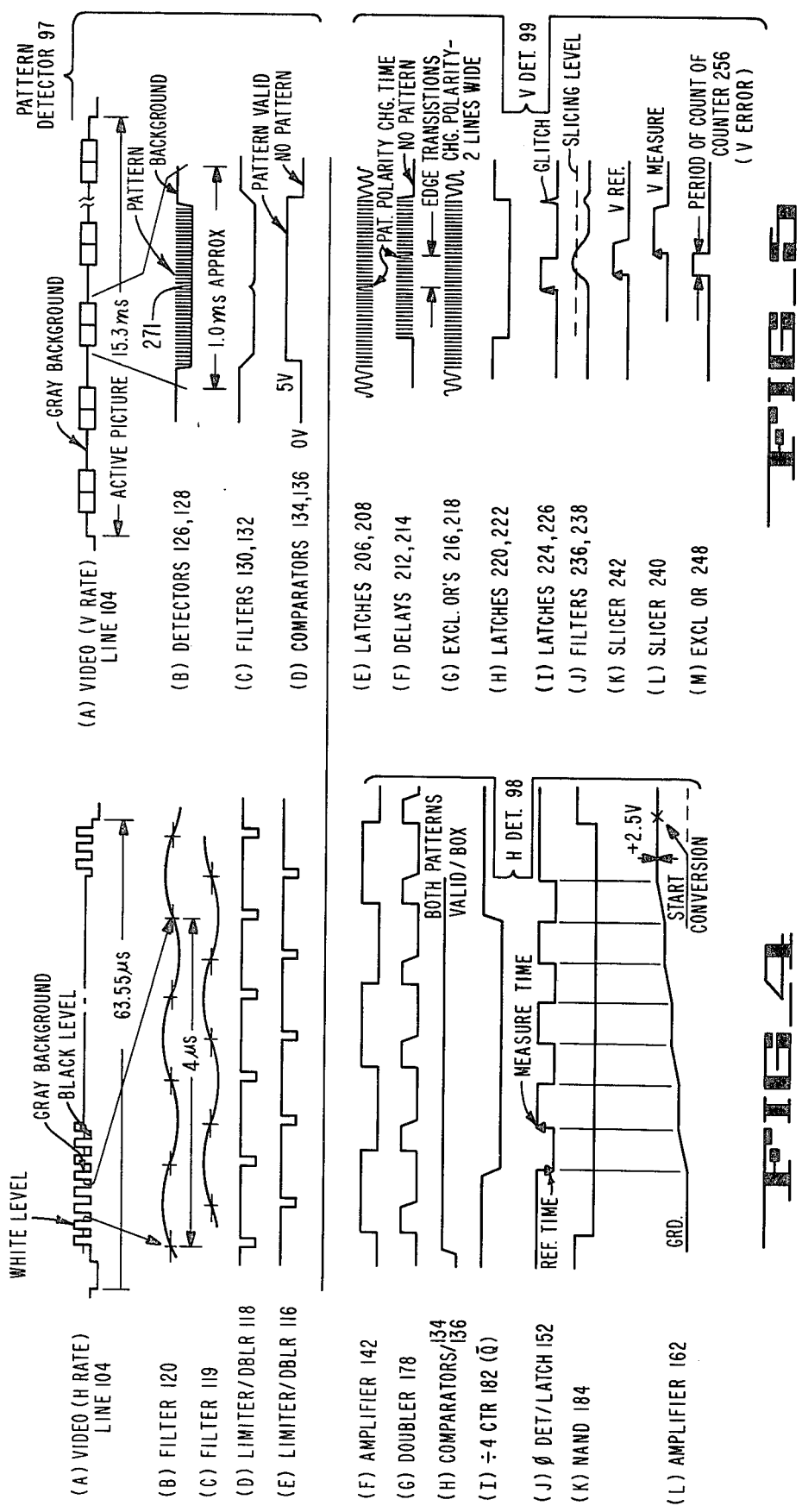

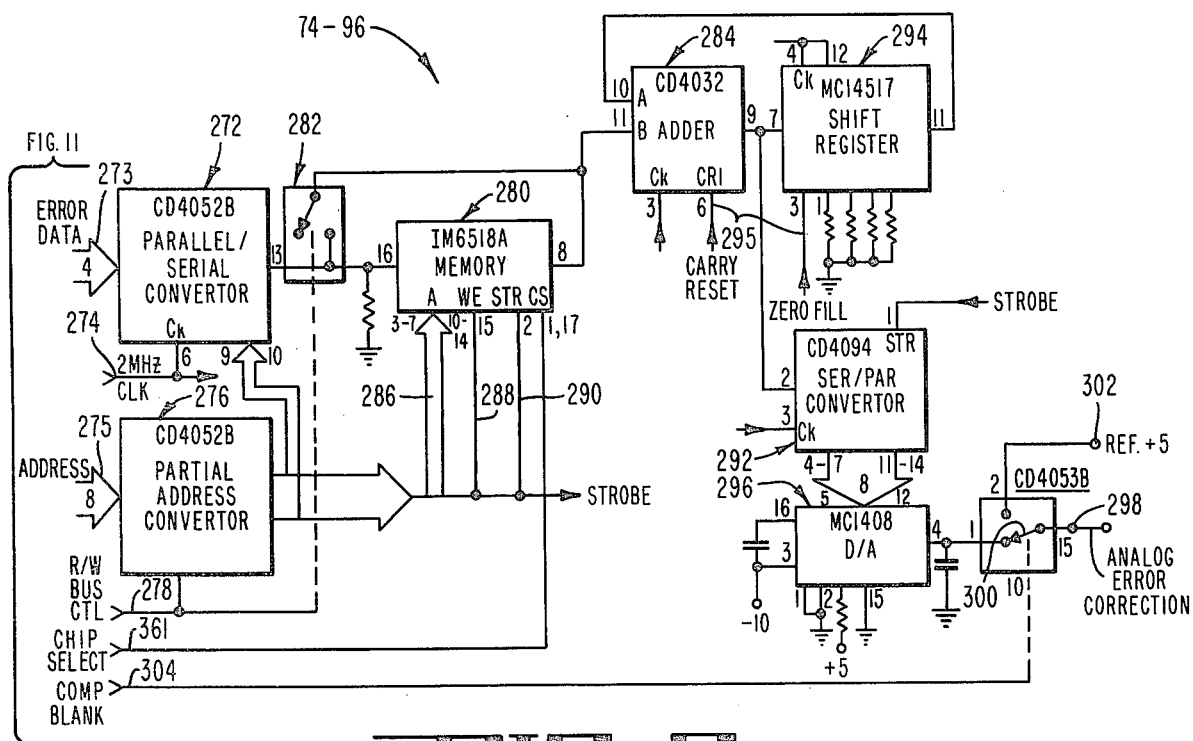
FIG_6
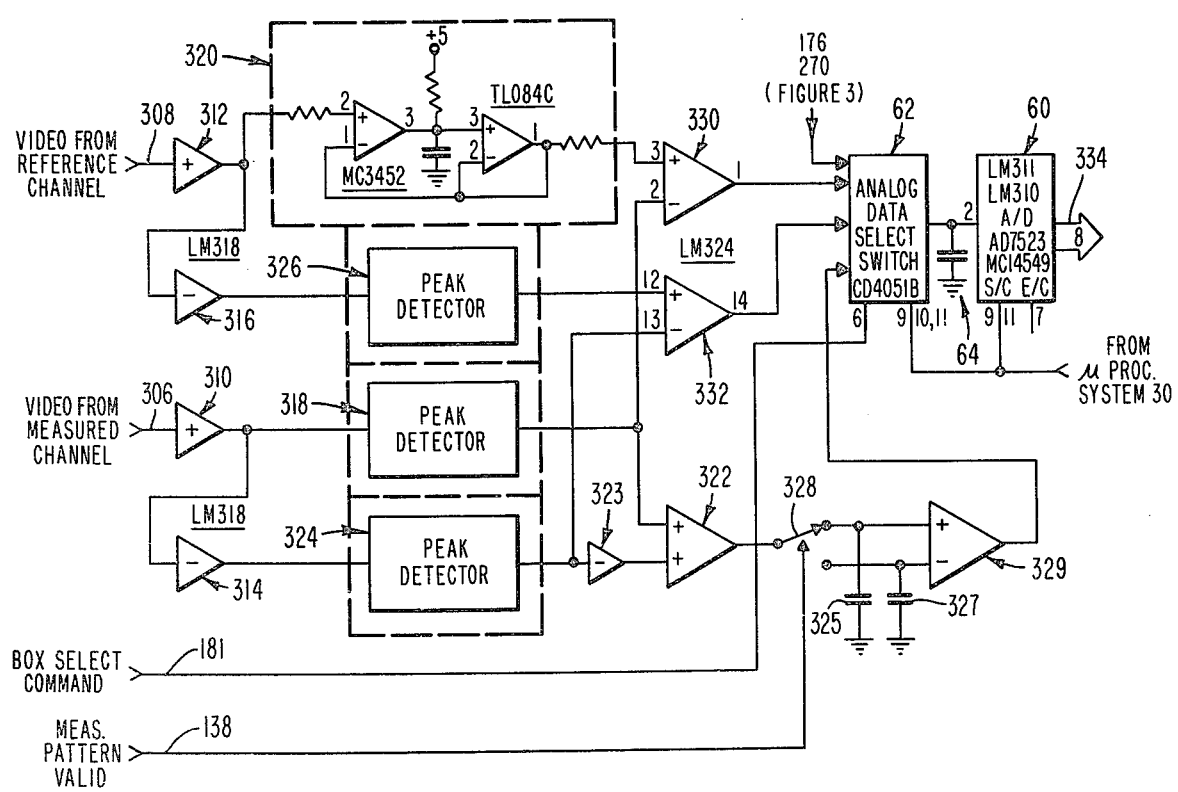
FIG_7

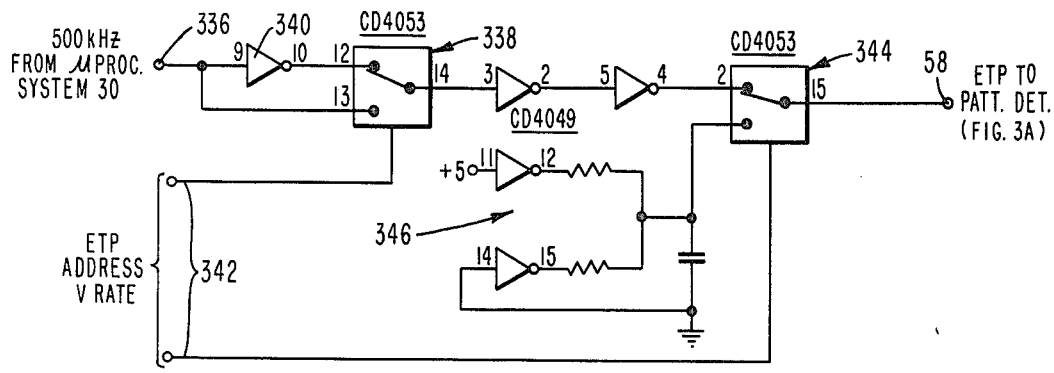
FIG_8
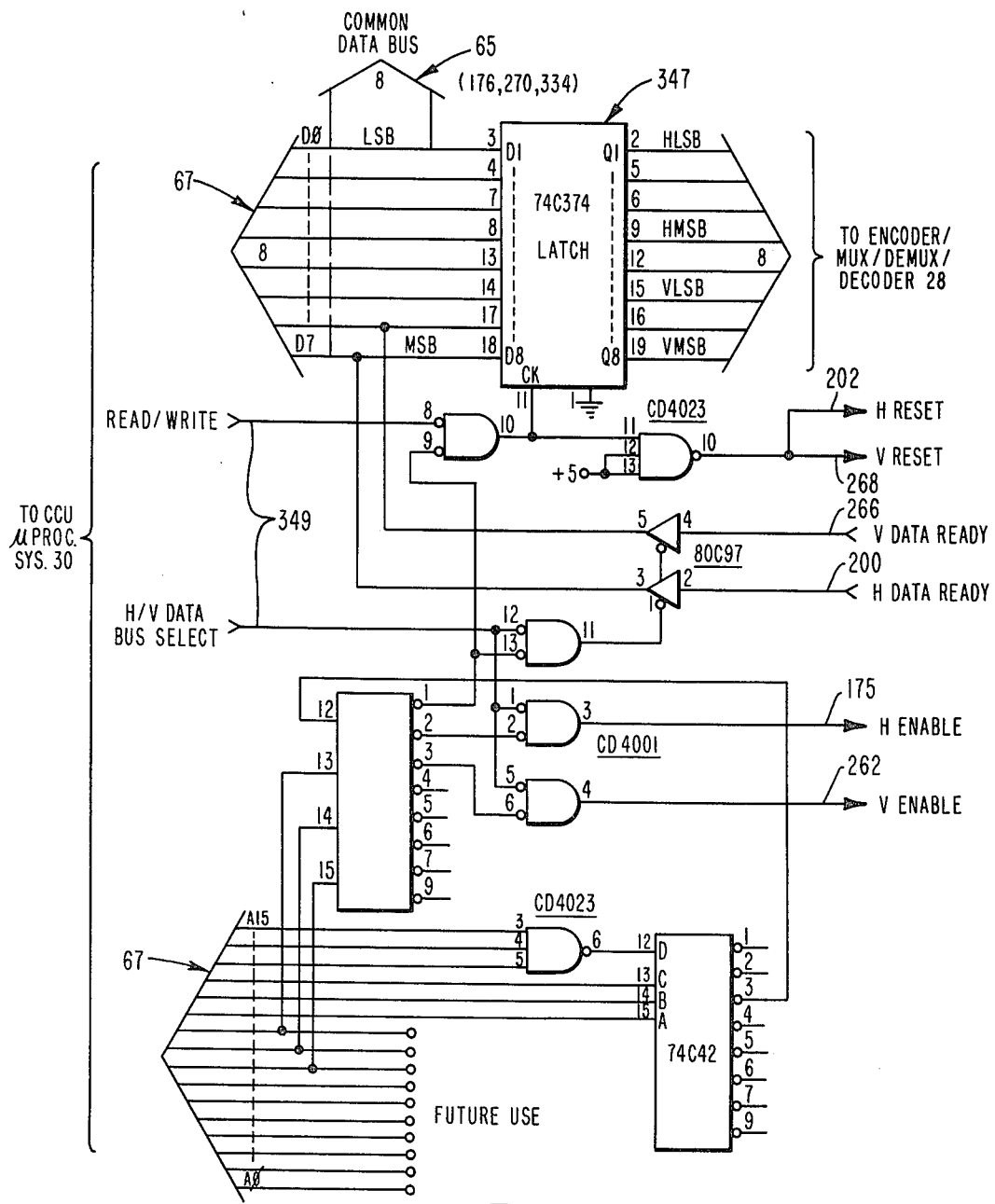
FIG_9

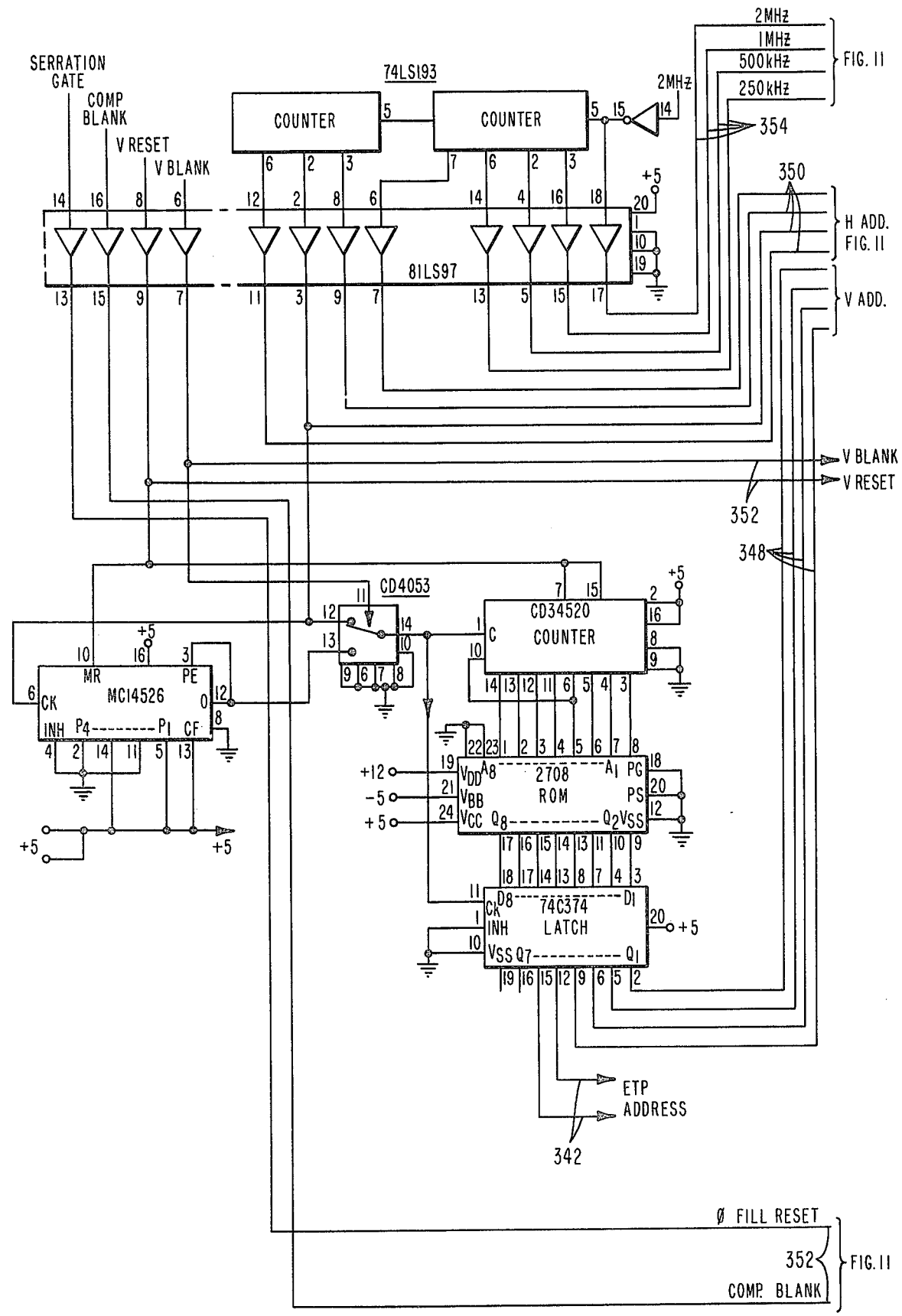
FIG_10

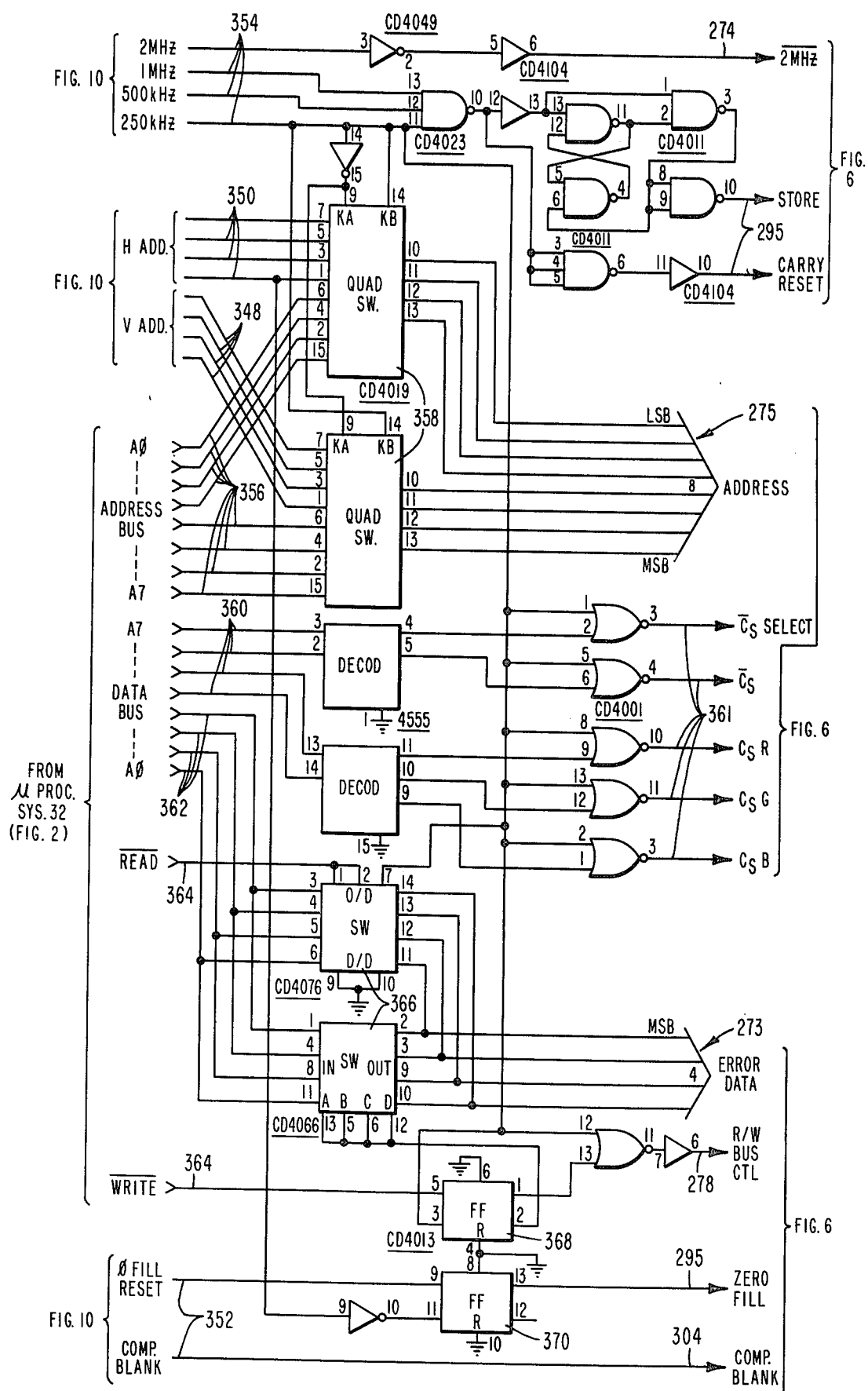
FIG_11

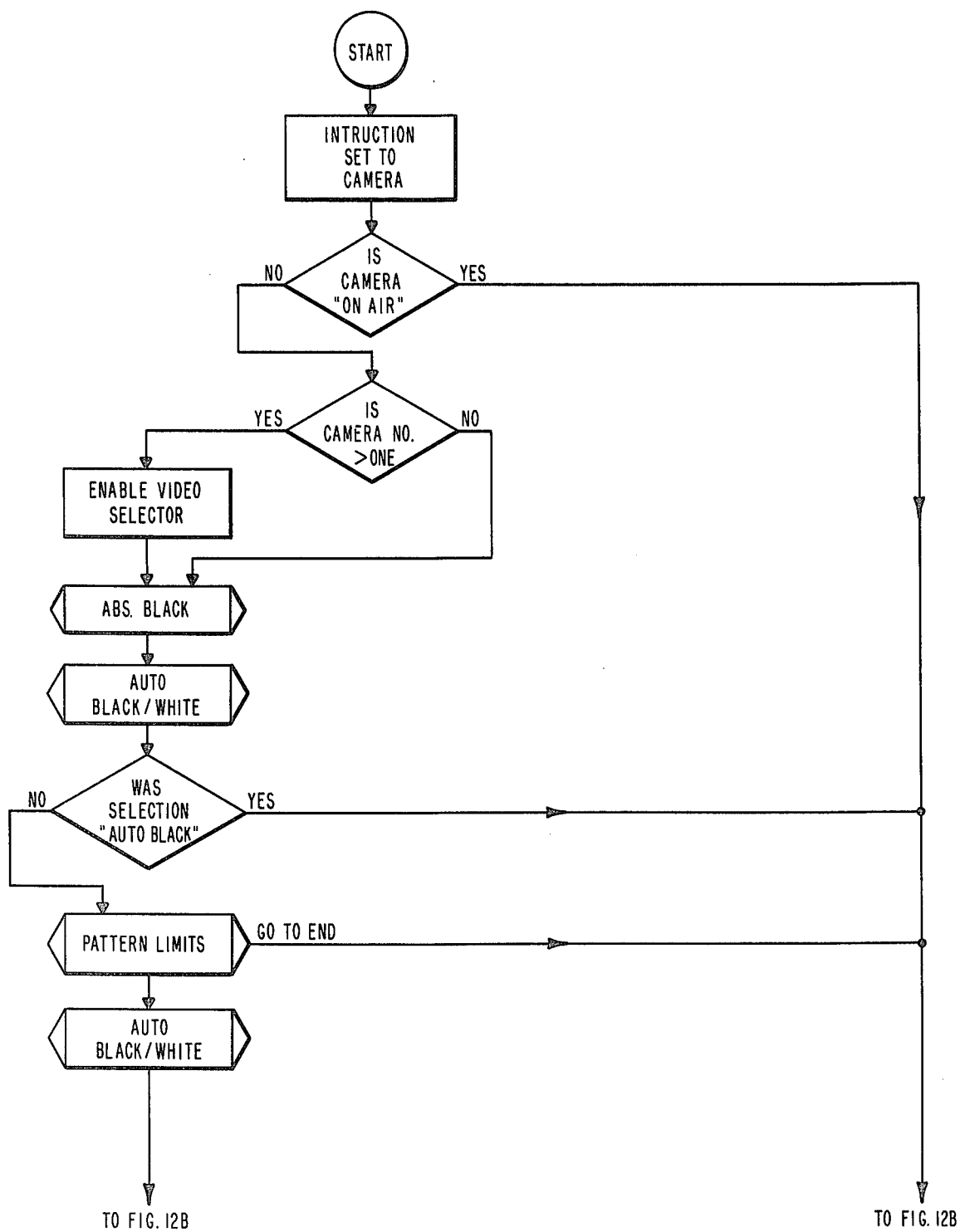
FIG_12A

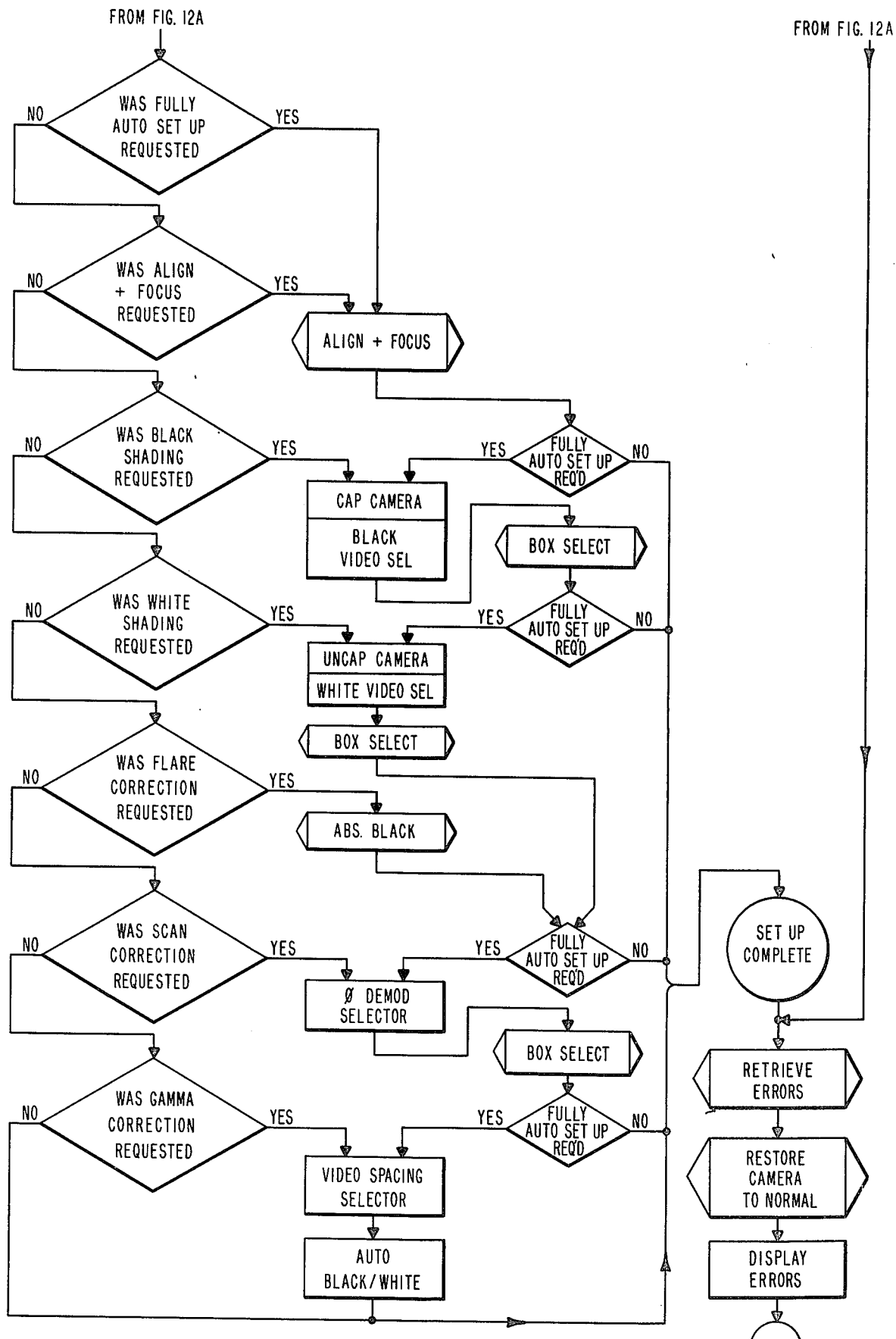
FIG_12B

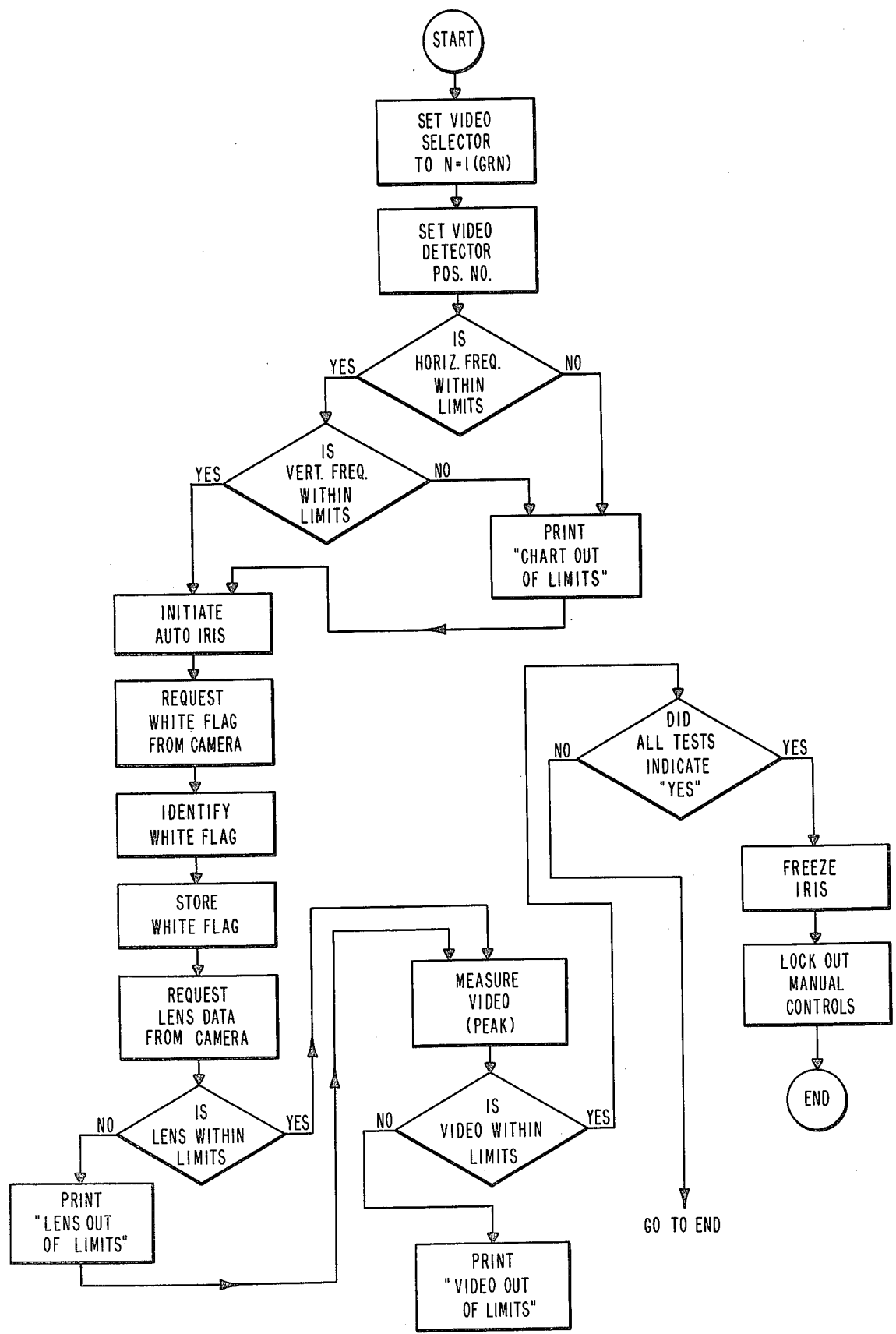
FIG_13

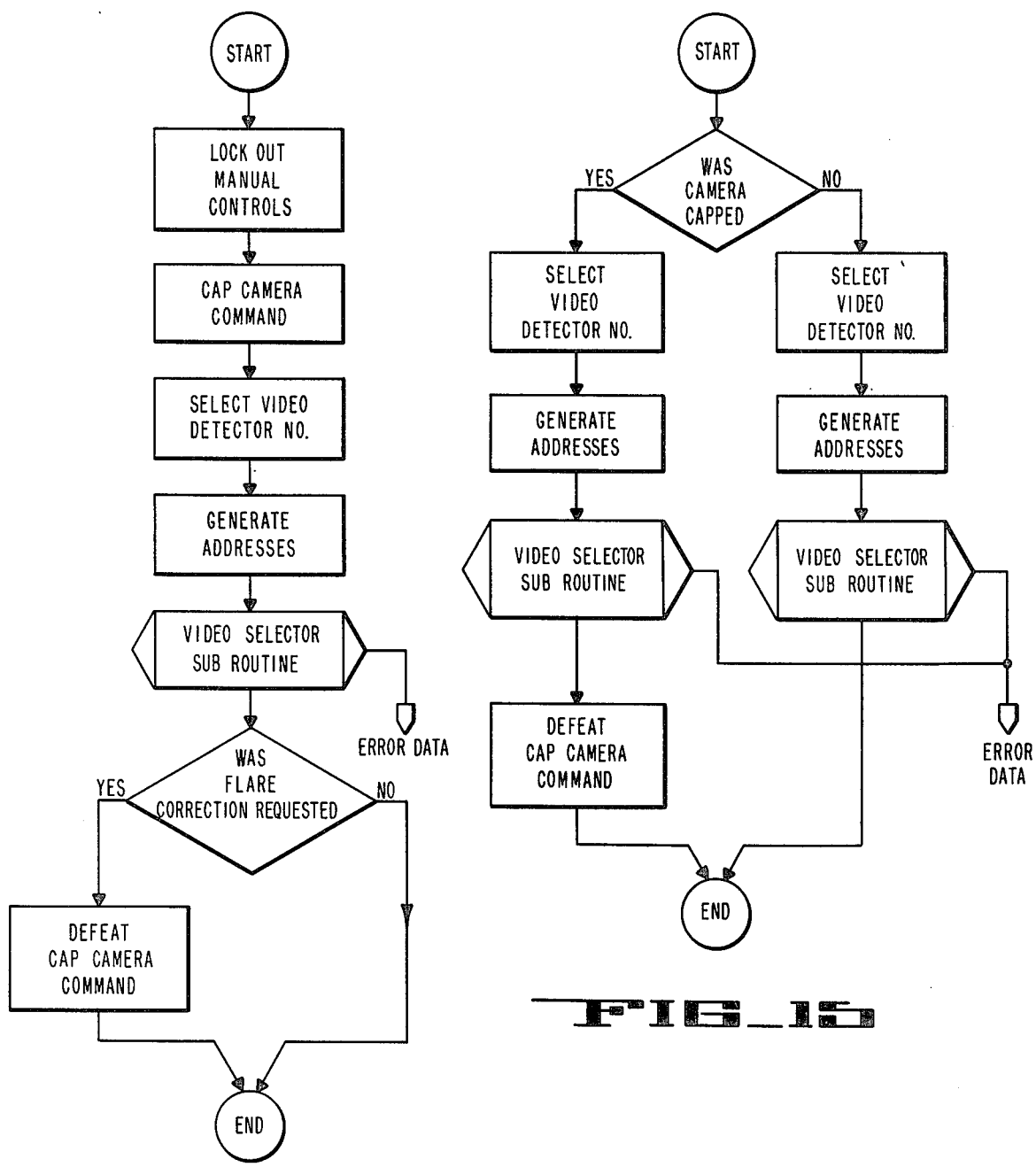
FIG_14
FIG_15

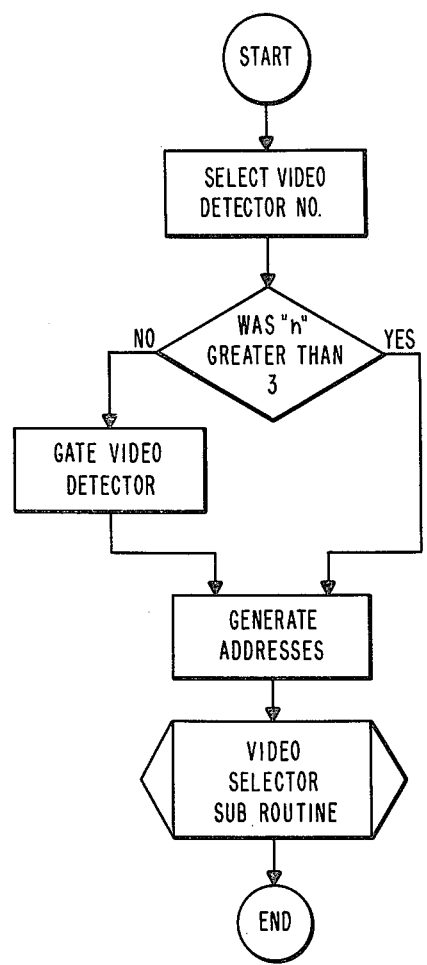
FIG_16
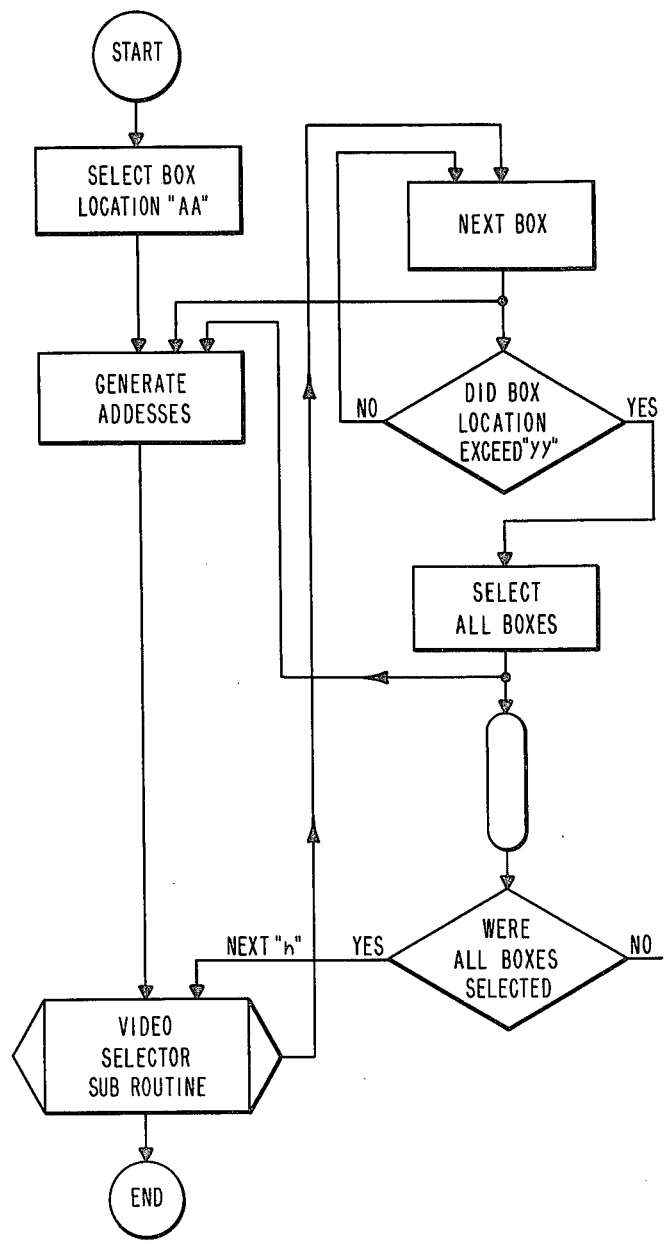
FIG_17

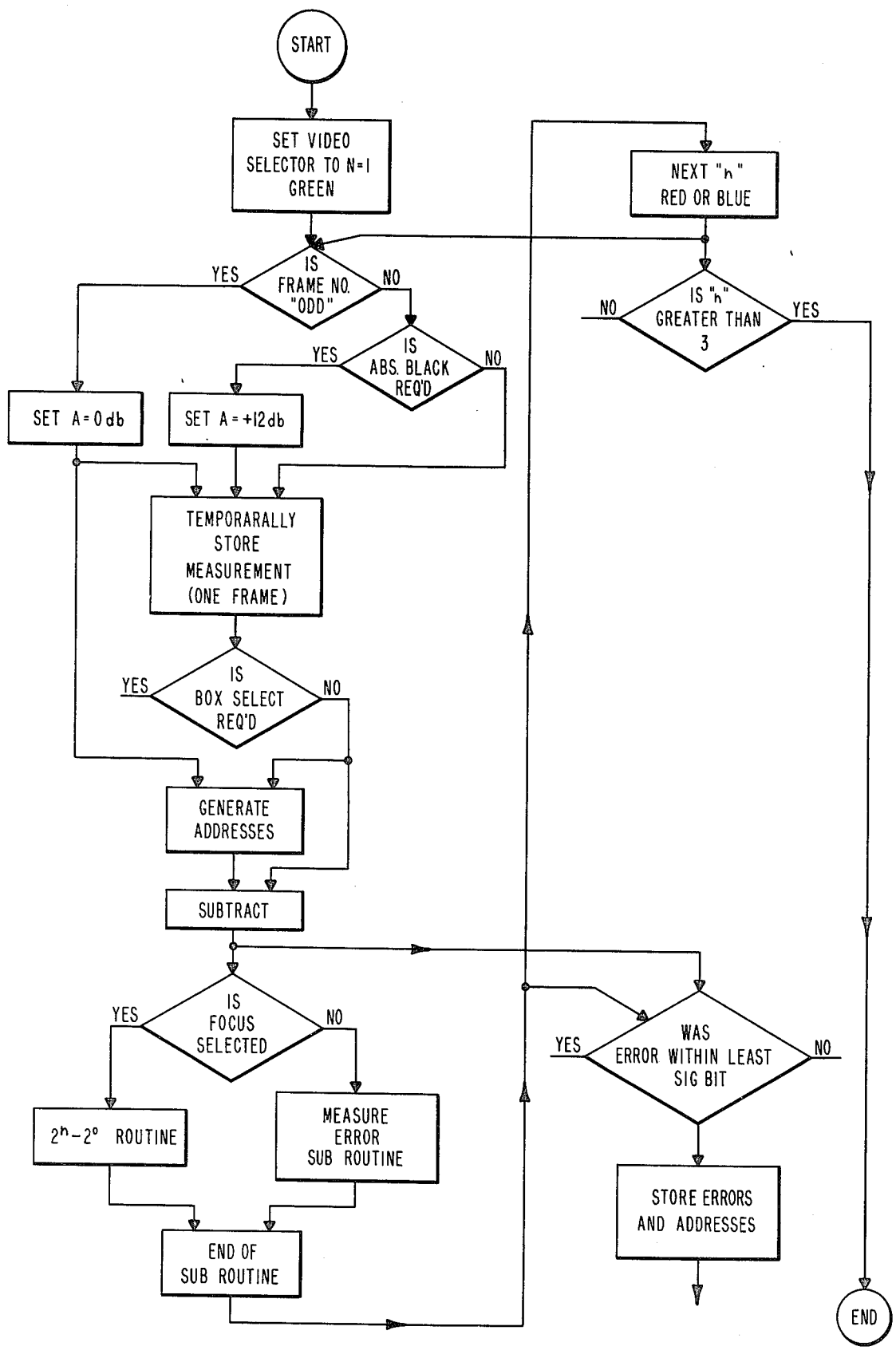
FIG_18

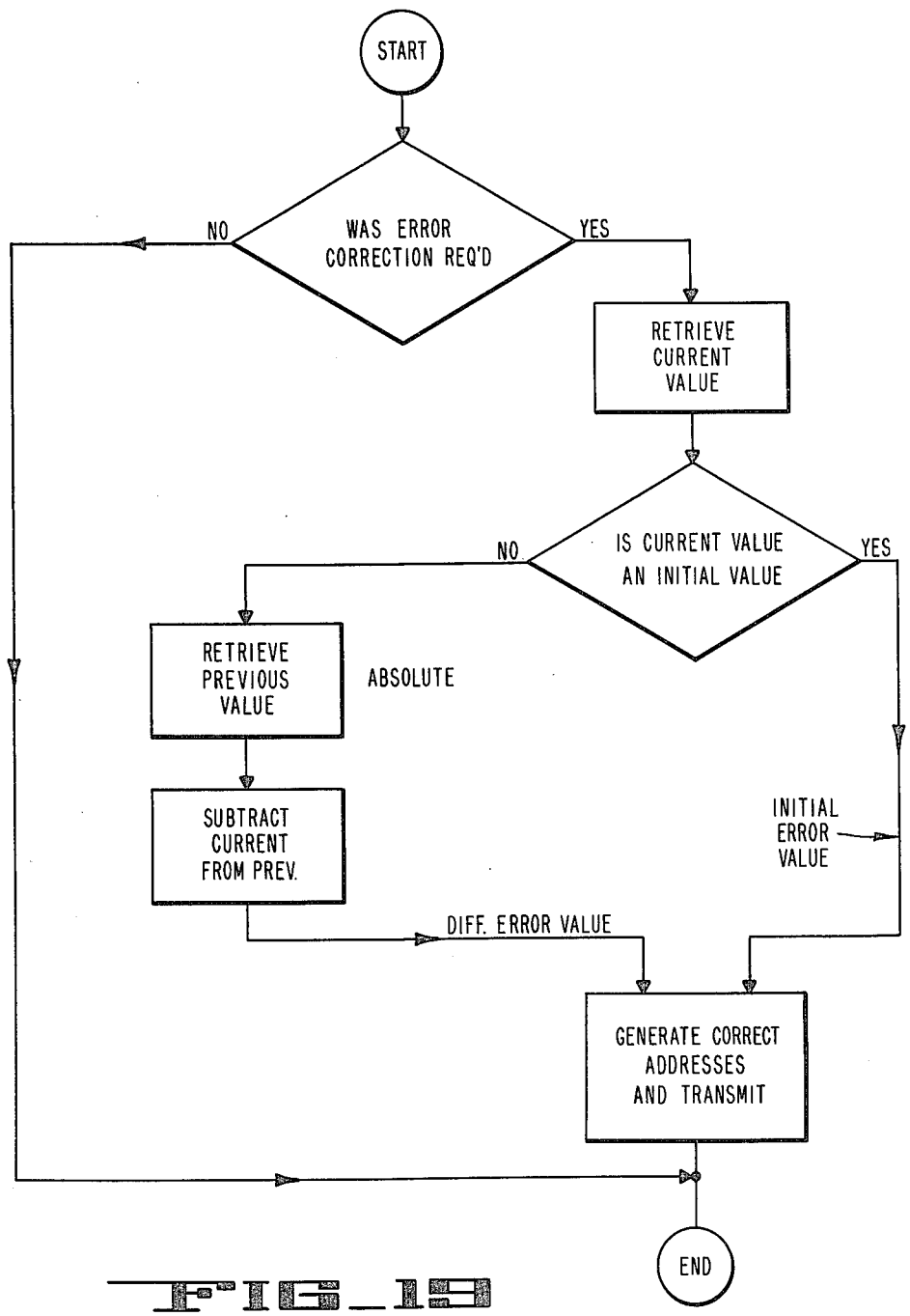

TOTAL RASTER ERROR CORRECTION APPARATUS AND METHOD FOR THE AUTOMATIC SET UP OF TELEVISION CAMERAS AND THE LIKE

BACKGROUND OF THE INVENTION

1. Field

The invention relates to pickup tube scan correction devices, and particularly to a scan correction circuit and method for correcting the geometric, registration and shading errors generated in electron beam scanned and/or self-scanned image sensors.

2. Prior Art

In multiple tube video cameras, the images formed on the targets of the respective tubes must have correct spatial correspondence relative to each other to insure that the color component pictures subsequently displayed via a monitor, television receiver, etc., are in register, i.e., are spatially superimposed at all points. Consequently, the color analysis arrangements and the camera tubes must be very stable mechanically, and the scanning patterns traced on the tube targets must be as stable and identical as possible.

The characteristics of a camera tube that relate output signal and scene brightness, together with that of any gamma corrector used, must be such that over a large range of scene brightness an approximately linear relationship exists between a change of scene brightness and the corresponding change at the display. Therefore, in a camera employing several tubes and several gamma correctors, the combined characteristics of one tube and its associated corrector must be well matched to the others.

It follows that in prior art camera systems employing multiple pickup tubes the deflection yokes are first computer matched to provide yokes and tubes with similar characteristics, and thus scan raster geometries which are as matched as possible. In addition, one tube (for example, the green color channel tube) may be selected as a master tube/channel, and various analog waveform driving signals, specifically modified commensurate with the remaining geometric and registration scan errors of the (remaining) slave tubes/channels, are applied via suitable electronics, to thereby match the scan rasters of the slave tube, or tubes, with the master tube scan raster.

In such camera systems, it has been assumed that the original geometric and registration scan errors are corrected by using a sufficient number of waveshapes synchronous to the two scanning waveforms, which are then applied by adding them to, and/or modulating, the original scanning waveforms. However, all geometric and registration errors cannot be eliminated using the above techniques, since the scan errors only approximate the two orders of sawtooth and parabola waveforms, which are commonly used for scan correction.

In addition, camera systems employing a manual set-up use potentiometers located on a control panel which is integral with the central control unit (CCU). The CCU is in turn remote from the camera head unit and is coupled thereto via multiplexed parallel conductors in a cable, or the like. The analog error correction signals are encoded, multiplexed and decoded, thereby requiring a considerable amount of analog circuitry, which generates considerable drift and thus stability problems. The potentiometers must be continually read and readjusted, whereby the camera head system is continually dependent upon the signals from the CCU for proper operation.

By way of example only, typical of camera systems which employ the above correction techniques to provide scan and shading error corrections are the broadcast color cameras, Models BCC-1 and BCC-10, shown in the Ampex "Service Data Package" Manual No. 1809326-01, Ampex Corporation, Redwood City, California.

SUMMARY OF THE INVENTION

The digital scan correction technique of description herein overcomes the shortcomings of the previous scan correction systems by providing a precisely accurate means for automatically detecting, digitally handling and storing, and correcting any black and white shading errors and any spatial errors existing in a pickup sensor and/or between multiple sensors of, for example, a monochrome or color video camera. To this end, the error correction data, as well as the conventional control signals, are digitally stored in a memory within the camera head system itself, whereby the camera head retrieves the digital correction data independently of the CCU during the real time operation thereof.

To this end, geometric errors that occur as the result of time variations in the scan across a pickup sensor of a television camera, and registration errors that occur in a video camera having a multiple pickup sensors as the result of differences between the absolute position of each individual scan at any point in time on the sensor raster, are measured by providing an electronic test pattern containing numbers of fine black and white horizontal and vertical lines, and selectively comparing the video signals of one sensor or multiple sensors with the test pattern.

Black and white shading errors that occur due to non-uniform output from the pickup tubes or sensors produce video baseline drift and video level variations and are measured by comparing the amplitude of the video signal against respective selected black and white D.C. levels with and without a cap on the camera lens.

To this end, a conventional camera head system includes image pickup tubes coupled to suitable video processing circuits, and amplifier/driver circuits coupled to the scan control means of the tubes. An error measurement circuit is coupled to the video processing circuits to receive from the camera head system a selected form of red, green and blue video signals, and provides means for determining the shading and spatial scan errors experienced by the tubes. Encoder/decoder and multiplexer/demultiplexer means are coupled to the error measurement circuit and are used with a data transmission channel for introducing the resulting digital error data to an error corrector circuit in the camera head system. A central control unit (CCU) microprocessor system provides controls and addresses to the error measurement circuit and to the encoder/decoder and multiplexer/demultiplexer means.

The error corrector circuit includes a camera head microprocessor system and a main memory coupled to handle the digital error data (as well as the conventional camera head control signals) received via the data transmission channel. During real time camera operation, the digital error data are retrieved by way of the camera head microprocessor system and are applied to spatial scan and shading error corrector circuits in the camera head system. The error corrector circuits supply the corrected analog scan driving waveforms to the tubes via the amplifier/driver circuits, and the corrected D.C. shading levels to the video processing circuits. The gamma correction signals are applied directly to the video processing circuits to provide the total raster error correction.

Thus the error measurement circuit provides automatic means for generating horizontal and vertical geometric and registration error data, as well as black and white shading error data, prior to real time camera operation. The resulting error data are digitized, transmitted and stored in the camera head system and, during real time camera operation, are applied in the form of error correction data to respective tube driving circuits and video processing circuits. The stored digital error data are updated as required via new input from the error measurement circuit.

BRIEF DESCRIPTION OF THE DRAWINGS

FIG. 1 is a simplified block diagram of the total raster error correction system of the invention combination.

FIG. 2 is a more detailed block diagram of the system of FIG. 1.

FIGS. 3A–3D are still further detailed block/schematic diagrams of the error measurement system of the system of FIG. 2.

FIGS. 4A–4L and 5A–5M are graphs of waveforms generated at various points along the circuits of FIGS. 3A–3D.

FIG. 6 is a block diagram exemplifying one of the twelve identical total raster error corrector circuits of the system of FIG. 2.

FIG. 7 is a block/schematic diagram depicting the black and white shading error, and the gamma error, measurement circuitry integral with the spatial error measurement system of FIGS. 3A–3D.

FIGS. 8–11 are schematic diagrams of various interface circuitry for the error measurement and error correction systems of the FIGS. 3A–3D, 7 and the FIG. 6, respectively; FIG. 8 illustrates an electronic test pattern generator; FIG. 9 illustrates the interface circuitry between the CCU microprocessor system and the common digital error data bus; and FIGS. 10 and 11 illustrate a sync generator and the associated interface, respectively, for interfacing the error correction system and the camera head microprocessor system.

FIGS. 12A, 12B are a flow chart of the steps in the entire automatic set-up routine for a television camera, and which includes inter alia the spatial and shading error correction procedure of the invention combination.

FIGS. 13–19 are flow charts of various sub-routines employed in the routine of FIGS. 12A, 12B.

DESCRIPTION OF THE PREFERRED EMBODIMENTS

Figure 3B:
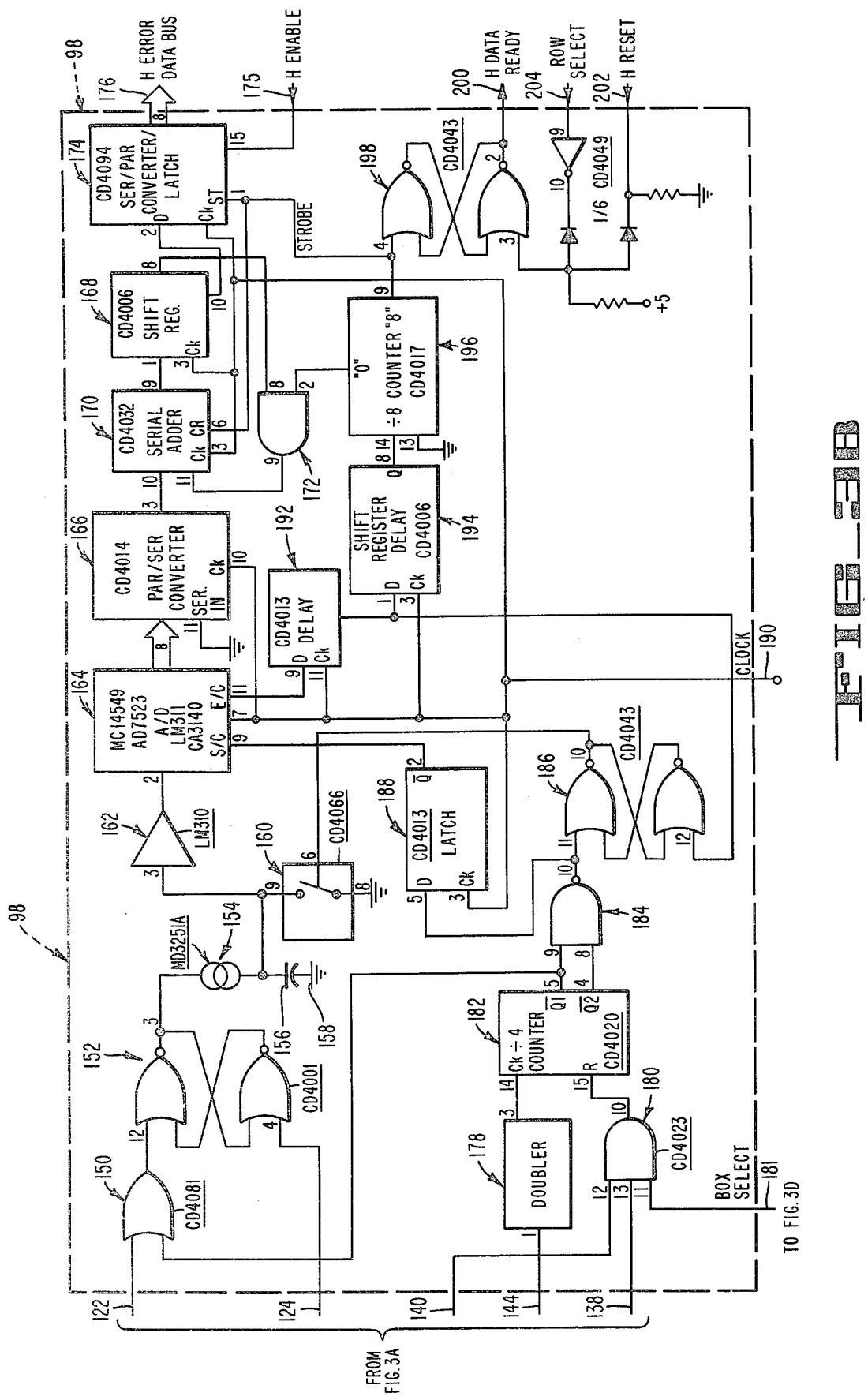

Spatial scan errors, as defined herein, are a combination of registration errors that occur in, for example, a multiple-tube color television camera as the result of differences between the absolute position of each electron beam on the target of the camera pickup tube at any point in time, and geometric errors that occur as the result of positional displacement of an electron beam as it scans across the target of a television camera pickup tube. Black and white shading errors are video signal level variations caused by the optical and electronic components in the system. The combination of all errors experienced by the system and corrected by the invention combination, are herein termed "total raster" errors.

The system automatically performs the spatial, or scan, error measurements by dividing the area of the picture into a number of smaller areas herein termed "boxes", and by comparing the tube scans at selected points within the boxes with a given test pattern compared in turn with the picture. The size of the individual boxes are weighted by a fixed factor proportional to the magnitude of the typical geometric error. The error waveforms corresponding to the absolute horizontal and vertical positional errors at the start of each and every box, and at the end points of the last boxes, are digitally stored in selected memory means in the camera head system. Errors between these points are interpolated by integration in real time of the differential errors between the measured points as they are read out of the main memory means in the camera head system during the scanning process.

Shading errors are derived by comparing the video white and black voltage levels with the white areas of the electronic test pattern for white shading, and in the black areas with the lens capped for the black shading, wherein the errors are averaged over the entire picture for each pickup tube or sensor. The shading errors are digitized, stored in the camera system memory with the spatial error data, and retrieved during real time camera operation.

Gamma errors are derived by comparing the video voltage level in the gray area of the electronic test pattern against the mean black/white D.C. level, which gamma errors are stored in the camera system memory for subsequent retrieval in real time.

FIG. 1 is a simplified block diagram depicting the basic combination of the invention, comprising generally a camera head system 12 usually remotely disposed from an error measurement system 14. The camera head system 12 includes a conventional optical color-splitting lens 16 and a three-tube configuration 18, 20, 22 generating the red, green and blue (RGB) video color signals, respectively. The RGB color signals are introduced to an associated video processing means 24 which performs gamma correction, matrixing, etc., while further receiving the black and white shading error correction signals in accordance with the invention. The resulting RGB color signals are then introduced to total raster error measurement means 26 which determines shading and spatial errors experienced by the tubes, and which generates error signals commensurate therewith. The error signals are digitized and include horizontal and vertical displacement error signals and black and white shading error signals. The digital error data are then fed to means 28 for generally conventional multiplexing and encoding procedures. Means 28 herein include data transmission means and, upon transmission thereof, demultiplexing/decoding means for restoring the total raster digital error data. The error measurement means 26, the multiplexer and the code generator of means 28 are under control of a central control unit (CCU) microprocessor system 30.

The digital error data, and the conventional camera head control signals (input 68 of FIG. 2), are then fed to a camera head microprocessor system 32; the conventional control signals for focusing, iris and flare control, etc., are stored in a main memory 72 (FIG. 2), and the total raster error data are stored in memory means (FIG. 6) of raster error corrector means 34, with the locations defined by pertinent addresses. The digital error data are subsequently retrieved in real time in response to the microprocessor system 32. The latter also provides controls for the demultiplexer portion of the multiplexer/demultiplexer means 28. The retrieved digital error and address data from the memories are converted to analog error correction signals for introduction to the RGB pickup tubes 18, 20, 22 via summing amplifier/driver means 36. The black/white shading error correction signals are introduced directly to the video processor means 24. Thus, components 16–24, 32–36 generally comprise the camera head system 12 of previous mention. The microprocessor system 32 herein is a model F-8 manufactured by MOSTEK.

During the off-line, error measurement period of time, the camera lens 16 views a preselected optical test pattern 38 defined generally by horizontal and vertical alternate black and white areas 39, and which herein includes selected gray areas 41 therebetween for gamma correction purposes. In the example herein, the test pattern configuration produces an electrical output from the television camera that contains predetermined horizontal and vertical timing information of a selected reference repetition frequency, as well as black and white shading and gamma correction information, wherein the frequency is commensurate with the frequencies of the electronic test pattern signal. For spatial correction, the electrical video signal from this optical test pattern is compared to an electrically generated replica of the pattern 38 contained in the error measurement means 26. The electronic test pattern contains no errors, and is in the form of a modulated square wave having a frequency within the bandwidth of the color difference signals of a broadcast color television system.

As generally known for gamma correction purposes, the gray areas 41 have a transmittance (or reflectance) that is related to the black and white areas 39 by the equation; $T\text{ gray}=(T_{blk}+T_{wh}/2)^{2.2}$, where $1/2.2$ is the gamma law of a television camera. If the system has a gamma law of $1/2.2$, and an electronic test pattern signal is generated, with black and white values calibrated to zero and unity, respectively, then the output of the video circuits for; $\text{black}=(0)^{1/2.2}=0$; $\text{white}=(1)^{1/2.2}=1$; $\text{gray}=[(0+1/2)^{2.2}]^{1/2.2}=0.5$. It follows, if the gamma law of the system were any value other than $1/2.2$, the black and white levels remain unchanged, but the gray level would not be equal to 0.5. Likewise, if at the output, one-half of the black plus the white level does not equal the gray level, then a correction voltage may be derived (FIG. 7) to correct the resulting gamma error.

FIG. 2 depicts the system in further detail, wherein like components of FIG. 1 are given similar numbers. Thus the RGB color signals are fed to the video processing means 24, and particularly to the positive inputs of respective RGB differential amplifiers 40, 42, 44, which, in turn, are coupled to multiplier junctions 46, 48, 50. The negative inputs of the amplifiers 40, 42, 44 are coupled to RGB black shading error correction signals, and the RGB white shading error correction signals are applied to the multiplier junctions 46, 48, 50, respectively, as further described hereinbelow. Junctions 46, 48, 50 are coupled to video processing circuits 52 formed of, for example, aperture and gamma correction, etc., circuits conventionally employed in multi-tube video color cameras to provide broadcast quality color television signals. The gamma correction is applied to conventional gamma processing circuits depicted by dashed blocks 53, via the input line 55 from the microprocessor system 32. The video processing circuit means 52 is then adapted in generally conventional fashion to generate the RGB color signals.

It is to be understood that the three-tube configuration depicted herein by way of example may be replaced by other numbers of tubes, and/or solid state sensor imaging devices and combinations. Further, the raster error corrector system also may be employed in highly accurate monochrome scan apparatus, such as various monochrome data storage and retrieval systems, and is not limited to use in color video systems such as depicted herein by way of description only. Likewise, the video processing circuits 52 may include encoder means, whereby the error measurement circuit 26 handles encoded picture signals rather than the RGB color signals depicted in FIG. 2.

The RGB color signals are applied to the error measurement means 26, and particularly are selectively applied to the inputs of reference and measured channels of an error measurement circuit 54 thereof (further described in FIGS. 3A–3D and 7) via a video selector switch 56. External reference signals corresponding to the selector switch 56 via a reference electronic test pattern signal input 58 thereof, further described in FIG. 8.

The error measurement circuit 54 provides a number of error signal outputs in response to the video selector switch 56 and the reference electronic test pattern signal input 58 thereof. As further described infra, the electronic test pattern signals include, horizontal and vertical timing reference signals, and black and white shading magnitude reference signals. When measuring spatial and/or shading errors, the corresponding test pattern reference signal is selectively compared to the green color signal to provide the green channel error value corrections, and then the green color signal is selectively compared to the red and blue color signals to provide the error value corrections for the red and blue channels, with the sequence determined by the video selector switch 56. The error signal outputs from the error measurement circuit 54 include; an error signal which is a function of the time difference between the measured and reference inputs in the horizontal direction; an error signal that is the function of the time difference between the inputs in the vertical direction; and a pair of error signals that are proportional to the absolute value in voltage magnitude of the measured and reference inputs and which represent the black and white shading errors. The black and white shading error signals differ in that black shading errors are detected when the camera lens is (electronically) capped so no light enters and the video signal measured is true black, while the white shading errors are detected while viewing a picture with the lens uncapped, wherein the amplitude of the video which is proportional to the light is measured. The shading error data are thus represented by D.C. voltage levels.

The resulting black and white shading error signals are introduced to an analog-to-digital (A/D) convertor 60 via an analog data select switch 62 and sample/hold circuit 64. The data select switch 62 allows the successive selection of the shading error signals introduced thereto from the error measurement circuit 54, while the sample/hold circuit 64 conventionally maintains the sampled signals constant during the A/D conversion time.

The error measurement circuit 54, the video selector switch 56, the analog data select switch 62 and the A/D convertor 60, are under control of the CCU microprocessor 30, (via a line 109 and an address/control line 235, FIG. 3C) which selects the successive test pattern reference signals against which the green color signal is compared, the successive spatial and shading error signal output addresses, the timing controls for each reference selected, and which selectively receives and supplies control signals for the error measurement circuit 54, as further described below.

The overall automatic set-up procedure for the television camera, which inter alia includes the spatial and shading error correction procedures, is illustrated by the flow charts of FIGS. 12-19, wherein the routine and sub-routines are further discussed infra.

The digital shading error data generated by the A/D convertor 60, and the digitized horizontal and vertical spatial error data, are fed via a common digital error data bus 65, to the CCU microprocessor 30 via a bi-directional bus 67, and thence to encoder/multiplexer/data transmission means 66 corresponding to the encoder/multiplexer/demultiplexer/decoder means 28, to provide encoding and multiplexing the digital data into a serial data stream for transmission to the camera head system 12. The CCU microprocessor 30 provides a specific address for each piece of error data, as well as conventional timing controls for the means 66. Other conventional camera head data, such as control signals for iris, focusing, synchronizing, audio, etc., required by the camera, also are digitized and fed to the means 66 via an input 68 thereto, for multiplexing and transmission to the camera head system 12. The data is transmitted via selected cables, etc., to demultiplexer/decoder means 70 of the encoder/multiplexer/demultiplexer/decoder means 28, which means 70 may be located in the camera head system 12 rather than in the error measurement system 14.

The decoded error and address data are transmitted to the camera head microprocessor system 32 which provides control for storage and retrieval of the error data and addresses, as well as timing controls, for the camera head system 12, including controls to the demultiplexer/decoder means 70. The microprocessor system 32 includes main memory means 72, and a spatial error corrector memory means 280 (FIG. 6) in each of the error corrector circuits of means 34, wherein all raster error data are stored in the camera head system 12 as defined by the address data. Conventional control data are stored in the main memory 72, thus making the camera head system 12 totally independent of the CCU and the error measurement system 14 during real time operation of the camera. During real time operation of the camera, a sequential address is generated in time with the scanning of the sensors whereby the spatial and/or shading error data corresponding to the addresses, are retrieved from the spatial error corrector memory means 280 and the error data are applied to respective raster error corrector circuits 74-96 of the raster error corrector means 34. The circuits 74-96 then supply the respective analog error correction signals corresponding to the errors to be corrected. An example of the error corrector circuits 74-96 is described in FIG. 6.

In accordance with the invention, once error data has been stored in the camera head system 12, update error information may be supplied, when the camera is not on line via the error measurement system 14. The microprocessor system 32 takes the address, retrieves the prior error data from the respective memory means, takes the update error data supplied via the error measurement system 14, and either adds or subtracts it to the prior error data, and then re-inserts the updated error data back into memory. The updated error data then is retrieved and used by the camera head system 12 during real time operation thereof. Thus it may be seen that the spatial/shading/gamma error correction signals are self-contained in the (remotely located) camera head system 12 by virtue of employing the digital memory and the error correction circuitry in the camera head itself.

To this end, the microprocessor system 32 applies the spatial error data to horizontal (H) RGB and to vertical (V) RGB spatial scan error corrector circuits 74, 76, 78 and 80, 82, 84, respectively. The green color corrector circuits 76 and 82 are herein employed as the master error correctors, which provide the spatial error correction signals corresponding to the green channel error data previously taken relative to the reference, i.e., the electronic test pattern on input 58. The red and blue (slave) error corrector circuits 74, 80 and 78, 84, respectively, provide the red and blue spatial error correction signals corresponding to the red and blue error data previously taken relative to the green channel, whereby any H and V geometric corrections for each tube, and H and V registration corrections between the tubes, are made. The scan error correction waveforms generated by the H and V error corrector circuits 74-84 are applied to the H and V scanning yokes (not shown) of the tubes 18, 20, 22 via the generally conventional H and V summing amplifier/driver means 36, respectively. The correction waveforms are superimposed with the master H and V sawtooth waveforms introduced via inputs 93 and 95, respectively, in generally conventional manner.

The black and white shading error data are retrieved via the sequential addresses of previous mention, from the spatial error corrector memory means 280 of the RGB black shading, and RGB white shading error corrector circuits 86, 88, 90 and 92, 94, 96, respectively. As previously mentioned, the black shading error correction waveforms generated by the corrector circuits 86, 88, 90 are fed to the negative input of the RGB differential amplifiers 40, 42, 44, respectively, while the white shading error correction waveforms generated by the corrector circuits 92, 94, 96 are fed to the RGB multiplier junctions 46, 48, 50, respectively.

The spatial error measurement portion of the raster error correction means 26, i.e., the switch 56 and measurement circuit 54, and the operation thereof, are described in greater detail in FIGS. 3A-3D taken with the waveforms exemplified in the graphs of FIGS. 4A-4L and 5A-5M. The integral shading and gamma error measurement portion of the means 26 is shown in FIG. 7, and is discussed further below.

In FIGS. 3A-3D the error measurement circuit 54 includes an electronic pattern detector means 97 (FIG. 3A), and horizontal (FIG. 3B) and vertical (FIGS. 3C, D) error detector means 98, 99, respectively. Referring to FIG. 3A, the video selector switch 56 of FIG. 2 includes multiple sets of contacts 100a, b, c, d and 102a, b, c, d. The contacts are arranged such that 100a and 102a are in contact simultaneously, 100b and 102b are in contact simultaneously, etc. Contacts 100a, b, c, corresponding to the "measured channel" input of the error detection circuit 54 of FIG. 2, are coupled to the conventional RGB color signals, respectively, supplied on lines 104 from the video processor circuit 52. The contacts 100d and 102d are coupled to the (unblanked) electronic test pattern (ETP) signal (FIG. 8) via a buffer/attenuator circuit 106 and the input 58.

The G color signal also is coupled to contacts 102b, c, while contact 102a also is coupled to the buffer/attenuator circuit 106. The selector switch 56 is addressed via a pattern/video select address circuit 108, which also receives a vertical blanking signal via line 110. The pattern select address circuit 108 provides the following control table with respect to the measured and referenced channel inputs fed to the error measurement circuit 54, in response to channel selection control signals provided via the CCU microprocessor system 30 on line 109 (also FIG. 2).

| A | B | Reference Channel | Measured Channel |
|---|---|---|---|
| 0 | 0 | ETP | ETP |
| 1 | 0 | ETP | G |
| 0 | 1 | G | R |
| 1 | 1 G | B | |

The ETP signal is fed to both contacts 100d and 102d during vertical blanking.

The contacts 100 and 102 of video selector switch 56 are fed to substantially identical measured and reference channels, respectively, and particularly to 3-pole and 7-pole low pass filters 112, 114, respectively, of the order of 455 kiloHertz (kHz). The 7-pole filter 112 provides a signal which lags the signal of 3-pole filter 114 by 90 degrees at the test pattern reference frequency of 0.5 megaHertz (MHz). Filters 112, 114 are coupled to limiter/doubler circuits 116, 118 via high pass filters 119, 120, respectively, of the order of 100 kHz. The reference channel provides a reference 2F pattern signal on line 122, and the measured channel provides a measured 2F pattern signal on line 124, wherein F is the fundamental timing frequency component of the test pattern signal; and 2F is a signal of twice the fundamental frequency, as further discussed below.

The electronic pattern detector means 97 further includes identical measured and reference pattern valid channels which generate signals indicating either the presence or absence of a valid electronic test pattern. To this end, measured and reference peak detectors 126 and 128 are coupled to the low pass filters 112 and 114, respectively, and thence to low pass filters 130, 132. Measured and reference comparators 134, 136 are coupled to the filters 130, 132 and provide measured and reference pattern valid signals, respectively, on lines 138, 140, which signals provide an indication that the electronic test pattern employed in the measured and reference channels, i.e., employed in the generation of the reference 2F and measured 2F pattern signals on lines 122, 124, is present and valid.

The carrier frequency output port of the peak detector 128 is coupled to an amplifier 142 and provides a reference F data signal on a line 144, while the carrier frequency output port of the peak detector 126 is coupled to an amplifier 146 and provides a measured F data signal on a line 148. The measured and reference frequency signals generated by the pattern detector means 97 comprise, in essence, timing signals with transitions corresponding to particular timing instants of the respective incoming measured and reference channel video signals.

The outputs from the pattern detector means 97 are variously applied to the horizontal and vertical detector means 98, 99. In FIG. 3B, the reference 2F signal on line 122 is applied to one input of an OR gate 150, which forms an integral part of a phase detector 152 comprising a latch whose one input couples to OR gate 150 and whose other input is coupled to the measured 2F signal on line 124. The phase detector/latch 152 is coupled to a current source 154 and thence to a capacitor 156 grounded at 158, to one side of a grounding switch 160, and to an amplifier 162. An A/D converter 164 is coupled to the amplifier 162 and supplies an 8-bit parallel word to a parallel-to-serial converter 166. The serialized word is fed to a shift register 168 via a first input to a serial adder 170, wherein the shift register is fed back to a second input of the adder via an AND gate 172. The components 168, 170, 172 provide a serial adder and accumulator circuit. The output of shift register 168 provides the accumulated result of the additions and is coupled to serial-to-parallel converter/latch means 174, which provides 8-bit parallel data words on a horizontal error data bus 176 in response to a horizontal enable signal from the microprocessor system 30 (FIGS. 2 and 9) on line 175. H error data bus 176 corresponds to the common data bus 65 of FIG. 2. The data words define the horizontal spatial errors for storage and subsequent use by the horizontal spatial error corrector circuits 74, 76, 78 (FIG. 2) during real time camera operation.

The horizontal error detector means 98 further provides circuitry for controlling the generation of the horizontal errors. To this end, a frequency doubler 178 is coupled to the reference F signal on line 144, while an AND gate 180 is coupled to the measured and reference pattern valid signals on lines 138, 140, respectively. A "box select" command, which identifies the box in which samples are being taken, also is fed via a line 181 to AND gate 180 from the vertical detector means 99, as further described below. The doubler 178 provides a clock to a divide-by-four ($\div 4$) counter 182 while the AND gate 180 generates reset pulses therefor.

The $\div 4$ counter 182 provides a pair of enable signals every fourth incoming pulse; one enable is fed to the OR gate 150, and both are fed to a NAND gate 184. The latter is coupled to a reset latch 186, and also to a D-type latch 188, which is clocked via a 500 kHz clock on a line 190. The Q output of D-type latch 188 is fed to the "start conversion" input of the A/D converter 164 while the reset latch 186 provides switching control to the grounding switch 160. A delay circuit 192 is clocked by the 500 kiloHz clock on line 190 and, in response to an "end-of-conversion" signal from the A/D converter 164, supplies an output to the reset latch 186, and an output to the D input of a shift register delay circuit 194. The latter is also clocked by the 500 kHz clock on line 190, and is coupled to a divide-by-eight ($\div 8$) counter 196. An output signal from the counter 196 is fed to the second input of the AND gate 172 when the counter is at zero count, and the output signal therefrom, indicating every eighth input pulse, is fed to a latch 198, to the carry input of the serial adder 170, and to the strobe input of the serial-to-parallel converter/latch means 174. Latch 198 generates a horizontal "data ready" signal on line 200 in response to a horizontal reset pulse on a line 202 from the microprocessor system 30 (FIGS. 2 and 9), and to a "row select" signal indicative of the row being sampled which extends from the vertical detector means 99 on a line 204. The clock inputs of the adder 170, shift register 168 and converter/latch 174 are also operatively coupled to the clock on line 190.

The vertical error detector means 99 of FIGS. 3C, 3D provide the equivalent vertical spatial errors via generally similar measured and reference channels. Thus D-type flipflop latches 206, 208 are clocked by a H/64 frequency (1 megaHz) clock on line 210, and receive the measured F and reference F signals from the electronic pattern detector means 97 on lines 148, 144, respectively. The latch outputs are fed to respective 2-line delays 212, 214 and thence to exclusive OR gates 216, 218, which are also coupled to the outputs of the flip-flops 206, 208, respectively. The delays 212, 214 are clocked via couplings to the H/64 clock on line 210. The measured and reference pattern valid signals on lines 138, 140 are fed to latches 220, 222, whose second inputs are coupled to the 2-line delays 212, 214, respectively. The latches 220, 222 are coupled to the reset inputs of D-type latches 224, 226, whose D-input receives the outputs of the exclusive OR gates 216, 218, respectively. The latches 224, 226 are clocked via NAND gates 228, 230, whose inputs are coupled to the box select command on line 181, and to the H/64 clock on line 210.

The box select command of previous mention is generated by a digital magnitude comparator circuit 232, which is coupled to horizontal and vertical sync generator addresses via an input bus 233, and to horizontal and vertical box addresses via an input bus 235 (also FIG. 2). The sync and box addresses each comprise 8-bit words provided by the CCU microprocessor system 30. The digital magnitude comparator circuit 232 also provides the row select command on a line 204 which is fed to a 2-field counter 234, flip-flops 244, 246 (FIG. 3D), and to the latch 198 of the horizontal error detector means 98. When the requested 4-bit V box address from the microprocessor system 30 equals the 4-bit V sync address from the system sync generator (similar to the sync generator/interface of FIGS. 10, 11), the row select command on line 204 is generated relative to a given box. When the row select command of the vertical portion of the comparator 232 is applied to the horizontal portions thereof, the box select command on line 181 is generated when the H box address equals the H sync address and also equals the vertical row time period.

The Q outputs of the latches 224, 226 are fed to low pass filters 236, 238, and thence to respective slicer circuits 240, 242. The latter are coupled to the clock inputs of D-type flip-flops 244, 246 whose reset inputs are coupled to the row select command of line 204, and whose D-inputs are coupled to a +5 volt source. The flip-flops 244, 246 provide measured and reference channel signals, respectively, and are coupled to an exclusive OR gate 248. Flip-flop 246 of the reference channel also is coupled to the D input of a D-type flip-flop 250. The clock input of the latter is coupled to the exclusive OR gate 248 output, which also feeds to one input of a NAND gate 252. The other input of NAND gate 252 is coupled to a 250 kHz clock on a line 254. NAND gate 252 provides a clock for a counter 256, whose reset input is coupled to a strobe signal of the 2-field counter 234 of previous mention via a delay 257. The output of the counter 256 provides the vertical error averaged over two fields and is coupled to an exclusive OR gate 258, which also receives the Q output of the flip-flop 250. The Q output of flip-flop 250 corresponding to the direction of error is fed to a vertical data latch 260 along with the averaged error signal from the exclusive OR gate 258. The data latch 260 is strobed by the 2-field counter 234 output, while the enable input is coupled to a vertical tri-state enable signal on a line 262 from the microprocessor system 30 (FIGS. 2 and 9). A latch 264 is strobed by the 2-field counter 234 output via a delay 265, and provides a vertical data ready signal to the microprocessor system 30 on line 266, and receives a vertical reset signal from the microprocessor via line 268. The vertical data ready signal is fed via an inverter 269 to the set input of the 2-field counter 234. The vertical error signals are provided from data latch 260 as parallel 8-bit words on a vertical error data bus 270 corresponding to the horizontal error data bus 176 (FIG. 3B), and to the common data bus 65 of FIG. 2.

In operation, the electronic test pattern on input 58 to the pattern detector means 97 is an electronic replica of the two-dimensional optical test pattern 38 (FIGS. 1, 2), and has a perfect geometry of horizontal and vertical black and white lines (and which may have gray transitions therebetween for gamma correction). The pattern detector means 97 includes the two identical circuits, i.e., the reference channel and the measured channel. In the initial setting up, during which time any repeatable differential errors or discrepancies in timing between the electronics of the reference and measured channels, which would incorrectly appear as spatial/shading errors when in fact they are not, are measured and stored for subsequent use by the apparatus. These inherent circuit differential errors between the reference and measured channels are measured during vertical blanking, when no signal is received from the camera tubes.

To this end, referring to FIGS. 3A-3D, the video select switch 56 is switched to the contacts 100d and 102d in response to the pattern/video select address circuit 108 and the vertical blanking signal on line 110, under control of the microprocessor system 30 via line 109, whereby the electronic test pattern signal is applied to both the reference and measured channels. Since the inputs are identical, any errors which appear at the horizontal and vertical output buses 176, 270 are internal circuit errors, not spatial or shading errors. The manner in which the signals are measured and stored via the reference and measured channels is comparable to the process when detecting spatial correction errors and is described in further detail with respect thereto below.

After the inherent circuit errors have been measured and stored during vertical blanking, the video select switch 56 is switched to positions 100a and 102a via the pattern/video address select circuit 108 under the control of microprocessor system 30, whereby the electronic test pattern is fed to the low pass filter 114 of the reference channel and the green color signal is fed to the low pass filter 112 of the measured channel. During the camera set-up time when the spatial/shading errors are being measured and stored, the electronic test pattern signal on input 58 is essentially the same as the video signal on lines 104, except that the video signal includes the spatial and shading errors which are to be corrected. FIGS. 4A-4L and 5A-5M depict the horizontal and vertical rate waveforms, respectively, of the waveforms applied to, and generated in, the circuits of FIGS. 3A-3D. Thus, FIGS. 4A and 5A depict the electronic test pattern signal and the video signal, at the horizontal and the vertical rates, respectively. FIG. 4A shows a television signal of an electronic test pattern of 0.5 MHz square wave, i.e., a line period of 63.55 microseconds ($\mu$s) for a 525 line NTSC television standard. The FIG. 5A shows the signal at the vertical rate of 15.3 milliseconds (ms) which is the active time of a 60 Hz, 525 NTSC television picture, with the bursts of square waves and a gray level therebetween. The square waves are used for the black and white shading error measurements and for the spatial error measurements, and the gray levels are used herein, for example, for gamma correction. Thus the green color signal of the measured channel is compared to the electronic test pattern signal of the reference channel to determine the spatial errors of the former, which then are digitally stored for subsequent use during real time operation of the camera.

To this end, the green color signal and the electronic test pattern signal are low pass filtered by filters 112, 114, respectively, to remove all high frequency noise, since the desired information is contained in the crossovers of a frequency less than the frequency of the low pass filters 112, 114, i.e., approximately 500 kHz. The filters are identical, but low pass filter 112 is a 7-pole filter with exactly 90 degrees delay with respect to the 3-pole filter 114 at the test pattern reference frequency of 0.5 MHz. The low pass filtered signals are fed to the high pass filters 119, 120 of the order of 100 kHz high pass, whereby the resulting reference and measured signals shown in FIGS. 4B, 4C, respectively, have all baseband information removed. Note that FIGS. 4B-4L are shown in expanded scale relative to FIG. 4A. The signal from filter 119 lags that from filter 120 by a fixed delay of exactly 90 degrees at the pattern frequency as shown. The reference and measured signals are limited and frequency doubled by limiter/doubler circuits 116, 118, which generate narrow negative pulses at the crossover points of the incoming band passed signals at twice the input frequency, as shown in FIGS. 4D and 4E. The frequency is doubled to provide twice the amount of information. The measured 2F (twice-frequency) waveform lags that of the reference channel by 180 degrees, with periods of about 1 μs.

The low passed measured and reference signals also are fed to the peak detectors 126, 128 of the measured pattern valid, and the reference pattern valid channels, respectively. The detectors' 126, 128 outputs go low as shown in FIG. 5B to indicate the presence of the pattern. A glitch 271 in the center of the low indicates a pattern phase change. The pattern valid signals are low pass filtered via filters 130, 132 which have risetimes of about 50 μs (FIG. 5C) and are fed to respective comparators 134, 136. The latter define splicer circuits set to given thresholds to generate a high if the pattern is present, i.e., to produce respective measured and reference pattern valid signals on lines 138 and 140 only if the patterns are present and valid, see FIG. 5D.

Referring now to the horizontal detector means 98 of FIG. 3B, and to FIGS. 4F-4L, the reference F frequency signal on line 144 is shown in FIG. 4F and is fed to the doubler 178 which generates a twice reference frequency clock of 1.0 MHz (FIG. 4G) to drive the ÷4 counter 182. The latter counts on the positive edges. The measured and reference pattern valid signals on lines 138, 140 are fed to the AND gate 180 along with the box select command on line 181, whereby AND gate 180 supplies an output to the reset pin of ÷4 counter 182 only if both pattern signals are valid, i.e., high (FIG. 4H) and if the desired box signal is high. The counter 182 then is allowed to count four pulses whereupon it supplies an enable signal which is four pulses or samples wide (FIG. 4I) to the OR gate 150, i.e., to the phase detector/latch 152. Counter 182 also supplies another output pulse which is one clock pulse wider (FIG. 4K), which is gated along with the four pulse wide enable signal via NAND gate 184. Thus, the phase detector/latch 152 is set in one state by the reference channel four pulse signal of FIG. 4I, and is reset to its second state by the previously delayed, measured channel signal on line 124. The first of the four reference pulses sets the latch 152 to a low (FIG. 4J) after it has been enabled via the signal of FIG. 4I. Then the delayed, measured pulse (FIG. 4E) sets the phase detector latch 152 high (FIG. 4J), wherein the variation in the time interval between the time that the latch 152 goes low and then goes high corresponds to the spatial error which is being measured.

The wider clock pulse of FIG. 4K is fed to the grounding switch 160 via the latch 186. The latter is set by the low, the switch 160 opens and the capacitor 156 is allowed to charge via the current source 154. Previous closure of the grounding switch 160 has discharged the capacitor 156 to ground 158. When the measured pulse (FIG. 4E) resets the phase detector/latch 152, the current source stops charging, and the capacitor 156 remains at its charged level. When the next of the four reference pulses sets the latch 152 again, the current again flows into the charging capacitor 156 which charges to a new level, until the next measured pulse again resets the latch 152. The cycle repeats for four reference pulses, which places four charges on the capacitor 156, which total charge then comprises the average of four samples along part of a television line of any measured error within the box being sampled as selected via line 181. The measured analog output at the input to the A/D converter 164 is shown in FIG. 4L. It may be seen that variations in the interval during which the capacitor 156 is charged (FIG. 4J) causes corresponding variations in the charged level (FIG. 4L), which final value after four reference pulses represents the spatial error value which is stored. The period of time which the current source 154 charges the capacitor 156 is directly proportional to the absolute time difference between the measured and the reference channel signals, plus the fixed delay of 90° at pattern frequency caused by the differential delay of the two low pass filters 112, 114.

Thus, if the measured and reference channels are identical, and the electronic test pattern is fed to both (as during vertical blanking via contacts 100d, 102d), the output of the phase detector/latch 152 is a square wave (FIG. 4J), wherein the capacitor 156 is identically charged during each of the four reference pulses. During a spatial error measurement process, however, when the green color signal is compared to the electronic test pattern, or when the red or blue color signals are compared to the green color signal, the charging time intervals vary in accordance with the spatial errors, and the charge levels of the capacitor 156 vary accordingly to provide the green, red and blue spatial errors.

Averaging the errors over four samples along part of a television line within a box involves an integration process which improves the signal-to-noise ratio. In addition, if there are any rates of changes during measurement, the averaging of the multiple samples also provides an average of the rate of change, ergo, a more accurate error measurement. Obviously, other than four samples may be taken within a box to provide the averaging effect.

After the enable from the NAND gate 184 has ended, the latch 188 delivers a "start conversion" command to the A/D converter 164, as shown in FIG. 4L, whereby conversion takes place well after the last of the multiple measurements are made within the box. Upon finishing the conversion process, the A/D converter 164 delivers an "end of conversion" flag to the delay 192 which resets the latch 186. The latter's change of state closes the grounding switch 160, which discharges the capacitor 156 to ground 158. The circuit is then ready for the next four pulse error measurement cycle to be taken in the same or succeeding box, until eight such measurement cycles have been made on eight successive lines within a box.

The digitized signal from the A/D converter 166 is in parallel form and is changed to serial form via the parallel-to-serial converter 166 and is fed to the adder 170. The adder 170 is set to zero via the ÷8 counter 196, and the first digital number is loaded. The output of adder 170 is coupled to the shift register 168 and is then fed back to the adder 170 via the NAND gate 172 to be added to the next incoming serial digital number corresponding to the next line of the same box. The serial arithmetic process is repeated eight times for eight successive lines of one box, which thus provides an average of thirty-two samples of the spatial errors within the respective box. The accumulated number is fed to the serial-to-parallel converter/latch 174 and is divided by eight by shifting the output by three bits in response to the ÷8 counter 196. The digital output appearing at the horizontal error data bus 176 is thus the true average of the horizontal error. The counter 196 also forwards a flag to the CCU microprocessor system 30 via the latch 198 and line 200 to indicate the data is ready.

When the microprocessor wants the data, it enables the data bus 176 via the horizontal enable line 175 and the latch 174 accepts and uses the data and returns a reset flag on line 202 to set the latch 198. It also sends a H and V box address command to the vertical error detector means 99 (FIG. 3C), and particularly to the digital magnitude comparator circuit 232 thereof, via input bus 235, to step the apparatus to the next box in which samples are to be taken. Thus, the error measurement circuit 54 generates the errors at one speed and temporarily stores the data, whereby the slower-running CCU microprocessor system 30 operates asynchronously to utilize the data at its own speed.

As described above, the horizontal error detector means 98 preferably converts the data from a time-to-voltage magnitude form to more readily accommodate the high horizontal data rates. On the other hand, the vertical error detector means 99 operates throughout in the time domain, with no time-to-voltage conversion, since the vertical scan rate is much slower. However, the horizontal error detector means 98 also may be implemented to operate throughout in the time domain by employing a very high speed clock of the order of 60 MHz, and counting the number of clock pulses generated between the negative-going edge and the subsequent positive-going edge of the phase detector/latch 152 shown in FIG. 4J. The latter time interval is proportional to the spatial error, in time, of the respective video signal introduced on input terminal 104. Since the clock is a percentage of the horizontal scan, the magnitude in digital form of the average of the number of pulses corresponding to the time interval is the spatial error in percent. That is, since the clock is a percentage of the horizontal scan, the error in numbers of clock pulses is also a percentage of the scan.

Referring to FIGS. 3C–3D and also FIGS. 5A–5M, the vertical error detector means 99 receives the measured and reference pattern valid signals of FIG. 5D on lines 138, 140, respectively, and the reference F and measured F signals of FIG. 5B on lines 144, 148, respectively. Also introduced thereto are the H/64 clock on line 210, the sync generating address on line 233 and the box address command on line 235. The measured F and reference F data signals are clocked into their respective 2-line delays 212, 214 via the D-type latches 206, 208 and the H/64 clock introduced thereto from line 210. The H/64 clock is synchronous to the scanning system and clocks the data to its nearest transition such that the black and white transitions of the electronic test pattern are synchronous with the scanning line. The outputs of latches 206, 208 are shown in FIG. 5E, wherein the test pattern changes polarity at the middle of the pattern valid signal, i.e., at the time of the glitch 271.

The data passes through the 2-line measured and reference delays 212, 214 which are also clocked by the H/64 clock on line 210, whereby the clocked data is delayed by two lines, as shown in FIG. 5F and wherein the time of change of the test pattern polarity also is delayed by two lines. When the test pattern is not valid, or a pattern is not present, the pattern detector means 97 supplies zeros to the vertical error detector means 99, i.e., zeros are loaded into the 2-line delays 212, 214, and the outputs are low as depicted in FIG. 5F. The outputs go high when the pattern is valid.

At the input to the exclusive OR gates 216, 218, the high corresponding to the electronic test pattern start at a given polarity and, after a given number, e.g., two of horizontal scan lines, the pattern polarity changes. The data outputs from both the 2-line delays 212, 214 are identical as long as the pattern polarity is not changed. Upon the occurrence of the polarity change, the polarity of the pattern data output of delays 212, 214 will be different from the polarity of the pattern data fed directly from the latches 206, 208 to the exclusive OR gates 216, 218, due to the 2-line delay of the former. Thus, the exclusive OR gate outputs will be low when the signals are identical, and high during the period of time that the signals have different polarities. The exclusive OR gate 216, 218 outputs are shown in FIG. 5G and comprise edge transitions corresponding to the two-line period of change of polarity.

A data enable command (FIG. 5H) is fed to the latches 224, 226 via the latches 220, 222, respectively, to set the latches 224, 226 when the first piece of data is supplied after the 2-line delay. When the pattern valid signals disappear, the latches 224, 226 are reset, whereby the latter operate only during the period of time that the pattern polarity changes, as shown in FIG. 5I. Thus, with a high on the reset input of the latches 224, 226, the Q outputs thereof are low. When the reset input goes low, the incoming data is clocked to the Q output. The outputs of the exclusive OR gates 216, 218 are low during the time the pattern polarity is not changed. At the clocked edges, however, the pattern polarity changes, whereby the Q outputs of the latches 224, 226 are high for exactly two horizontal lines, i.e., 128 μs, after which they go low again (FIG. 5I).

The signals then are fed to the low pass filters 236, 238, are integrated (FIG. 5J) and are sliced at a preselected level. The reference and measured channel slicer circuits 242, 240 provide the rectangular waveform outputs of FIGS. 5K, 5L, respectively. The time that the output is high represents the time period of the reference signal, i.e., the vertical transition from black to white in the test pattern. The same is true for the measured channel signal. In the case where there is no time delay between the reference and measured channel signals, e.g., when the test pattern is fed to both channels, the occurrence of positive-going edges of the pulses of FIGS. 5K and 5L are coincident. However, if during a spatial error measurement process there is vertical error present, the output of the measured slicer circuit 240 is later than that of the reference slicer circuit 242 (FIGS. 5L, 5K). This provides a signal representing the true vertical displacement or error in terms of numbers of clock pulses (FIG. 5M). Thus, the pulses of FIGS. 5K, 5L are latched and fed to the exclusive OR gate 248, which provides the pulse of FIG. 5M any time that the former pulses are not coincident.

The output is gated via NAND gate 252 and enables the clock for the counter 256 which is synchronous to the 250 kHz clock thereto, whereby the counter 256 runs for as many clock pulses as the enable is on. Thus, the counter 256 accumulates binary numbers corresponding to the percentage of vertical scan error.

Since the NTSC 525 line television standard uses interlaced scanning, it is preferable to locate the true vertical position which varies between scan lines. Thus, the error measurement is made on two fields via the 2-field counter 234, by counting up to one number for one field and counting to another number on the next field to provide the average error for two fields. The data is stored in the data latch 260 via the exclusive OR gate 258, and is available to the CCU microprocessor system 30 (FIG. 2) on the vertical error data bus 270, as is the horizontal error data on horizontal bus 176.

Latch 250 determines whether the measured channel data is ahead of, or behind, the reference channel data, and determines the polarity of the data loaded into data latch 260.

When the data is strobed into data latch 260, the latch 264 is set to deliver a vertical data ready signal via line 266 to the microprocessor system 30. Upon taking the data from vertical error data bus 270 via the vertical enable command on line 266, the microprocessor resets the latch 264 via the line 268, and changes the box address via the box address command on line 235 in preparation for the next error measurement cycle.

As depicted in previous figures, the horizontal and vertical spatial errors are introduced as digital data on data bus 176, 270, to the means 28 for encoding/multiplexing, transmitting and decoding/demultiplexing the transmitted data. The latter components and their associated functions are under the control of the CCU microprocessor systems 30 and 32. The encoding process may be generally conventional utilizing, by way of example only, the Miller Squared technique. Any of various multiplexing/demultiplexing techniques may be employed which allow the transmission of digital data preferrably in encoded form, via conventional single or multi-conductor cables. Since the techniques for encoding/decoding multiplexing/demultiplexing and transmission of signals may be varied and are generally known in the art, the means 28 is not further described herein.

Upon receipt of error data in corresponding addresses by the camera head microprocessor 32, the system uses the addresses to integrate the memory locations of main memory 72, or of spatial error corrector memory means 280, to obtain the current working values of the respective error signals. Then the system 32 takes the incoming update error data and either adds it to, or subtracts it from, the existing data in the spatial error corrector memory means 280, or the main memory 72, and then reinserts the updated error data into memory. Thus, all data necessary to perform real time total raster error corrections, as well as data for performing conventional camera head controls, are contained in the camera head system 12.

Referring to FIG. 6, there is exemplified an implementation of one of the twelve identical corrector circuits 75–96 which together define the total raster error corrector means 34 of FIGS. 1 and 2. Thus, there are three vertical scan (RGB) and three horizontal scan (RGB) corrector circuits, and three white (RGB) and three black (RGB) shading corrector circuits. During the real time operation of the camera system, the microprocessor system 32 feeds the specific error data in parallel words to the respective one or more of the twelve corrector circuits 74–96, and particularly to a respective parallel-to-serial convertor 272 in each corrector circuit. The digital words are 4-bit words in the system of specific description herein, where differential error values are stored in the camera head system. However, 8-bit, etc., words may be used if further dynamic range is desired, as in the case discussed infra, where absolute error values are digitized and stored in the camera head system. The data is loaded via a line 273 in response to a 2 MHz system clock on line 274. Likewise, the addresses for the pieces of error data are applied via a line 275 and are converted to 10-bit words via a partial parallel-to-serial address convertor 276, in response to a bus control signal on a line 278. The data words on line 273, and the address words on line 275, are derived from the sync generator and interface circuits, FIGS. 10 and 11 respectively, of the microprocessor system 32.

The serialized error data is fed to the 1024×1 working memory 280 of previous mention, and the output thereof is fed back to the input via a switch 282, as well as to an adder 284. The switch 282 closure is controlled by the bi-directional bus control signal of line 278 which applies a read/write control signal. The partial address converter 276 delivers an address, a write enable and a strobe signal to the working memory 280 via lines 286, 288, 290, respectively. The adder 284 is coupled to a serial-to-parallel converter 292, as well as to a 64-bit shift register 294, wherein the output of the latter is fed back to a second adder input. A store/carry reset and a zero fill signal are fed to the adder 284 from the interface circuit of FIG. 11 via a line 295. The shift register 294 comprises in essence a 1-line delay. The serial-to-parallel convertor 292 is coupled to a D/A convertor 296, and the analog output is available on a line 298 via a switch 300. A reference voltage signal corresponding to the blanking level, or zero error, is introduced via a line 302 and a second contact of the switch 300. A composite H and V blanking signal on line 304 controls the position of the switch 300. A chip select command (Cs) on a line 361 to the memory 280, controls the selection of the plurality of memories 280 of the error correction circuits 74–96, such that the respective memory being enabled corresponds to the channel selected by the video selector switch 56 (i.e., spatial green, red or blue channels, or black or white shading green, red or blue channels).

Thus, in operation, the absolute error value for a selected channel, which represents the initial horizontal error at the start of the line, or the initial vertical error at the top of the video picture, is delivered in two 4-bit words. Subsequent differential error values may be provided as herein depicted, as single 4-bit words, since the magnitudes of the latter are significantly smaller, an alternate feature provided by the invention combination which allows use of relatively smaller memories. It is to be understood that although the error correction system is herein particularly described with respect to a differential error storage type of corrector circuit and method, the system is readily adapted to the digital storage, within the camera head system, of absolute error values by employing larger memory in the camera head. The differential error system employs smaller memory, but the absolute error system provides greater dynamic range, etc.

Thus, in an error correction system which digitally stores and retrieves absolute error values for every sample within the box array, i.e., within the picture, the adder 284 and the shift register 294 may be deleted. However, the memory 280 must then be large enough to store the data corresponding to every sample, and the address must be large enough to address every location in the memory. The memory locations are taken on a sample point-by-point basis, and the digital error data are converted in the serial to parallel convertor 292. The latter is updated with a new digital value for every sample point, and the data is applied to the D/A convertor for subsequent error correction as previously described.

The error data are retrieved via the camera head microprocessor system 32. Since serial arithmetic is a simpler process employing less hardware than does its parallel counterpart, the parallel-to-serial converter 272 is used to supply the initial and differential error data in serial form to the individual working memories 280 of the corrector circuits 74–96 (see also FIG. 2). When the camera head system 12 is turned on, the (twelve) corrector circuits 74–96 are cleared by loading the shift register 294 and thus the adder 284 with zeros via the zero fill command on line 295 (also FIG. 11), to ready them for the first incoming data, i.e., the two 4-bit words representing the absolute error values. The addresses are also converted to 10-bit words via the partial address converter 276, to correspond them to the serialized data words. The working memory 280 employs a 1024×1-bit arrangement for storing 256 4-bit words, which represent the 16 horizontal by 16 vertical box array into which the video picture is divided. There are in actuality, 14×14 active boxes within the video picture with two initial values available off the active picture raster. One of the boxes is used during the detection and storage of the circuit errors between the reference and measurement channels of previous mention in FIGS. 3A–3D, which measurements are taken when the electronic test pattern is fed through both channels during the V blanking interval.

On the first line of the picture the components are loaded with zeros, and the shift register 294 is reset via line 295. The first of the two initial 4-bit words is then loaded into the shift register, is fed back to the adder 284 input, and is added to the second initial 4-bit word. The serial arithmetic process continues with subsequent 4-bit words, corresponding to subsequent differential error values being successively added to the accumulating word. The error value corresponding to the error measured previously by the error measurement circuit 54, is accumulated in this particular example, after 16 television lines within each box are scanned during real time operation of the camera. The successive accumulation process performed over the 16 lines provides the vertical interpolation of the errors measured in a given box.

At the end of each word, the adder 284 could accumulate a carry. Thus the carry reset pulse of line 295 (also FIG. 11) prevents the carry in the adder from being carried into the next word. If the memory 280 is to be updated, it must be done without interfering with the read process of the memory running the adder 284. The four most significant bits of the adder and shift register 294 are normally zeros, and this provides a convenient time to update the memory 280. The store command of line 295 (FIG. 11), which is gated by the higher order address frequencies of line 354, selects the time when the memory is feeding out zeros to update the memory.

At the end of a line and/or a field, it is necessary to fill the shift register 294 and adder 284 with zeros, to prepare them for the subsequent new absolute error data words. The zero fill command of line 295 (FIG. 11) performs such function.

Thus the accumulating final raster error correction data is continuously fed to the serial-to-parallel converter 292, and the parallel data are converted to the corresponding analog error signals, which are being fed to respective summing amplifier/driver means 36 (FIG. 2) via the switch 300 and line 298 during camera head system 12 operation. The analog error correction signals include spatial, i.e., registration and geometric, horizontal and vertical, scan correction errors, and white and black shading error correction signals, as previously described. The gamma error correction signals are fed via the microprocessor system 32 directly to the video processing circuit 52 (FIG. 2) to perform conventional gamma correction.

During the vertical and horizontal blanking intervals of the picture, the switch 300 is switched to the reference voltage input on line 302 via the composite blanking input on line 304, which reference voltage is the main DC voltage upon which the error voltage is centered. Thus, during blanking, the scan beams are driven by a selected voltage level.

The generation of the error correction waveforms causes time delays to occur due to the vertical and horizontal integration, the scanning yokes, video processing, etc. These delays are fixed and known. Therefore, it is necessary to advance the error corrector circuits address generator, and thus the addresses (FIGS. 6, 10, 11) by these total fixed amounts, to compensate for the delay processes. This insures that the error correction, when applied, is located at the point in the picture which corresponds precisely to the point in the picture where the error measurement was made via the averaging process within a box.

The circuitry of FIGS. 3A–3D illustrate the error measurement circuits for determining the spatial scanning errors of the total raster error corrector system. FIG. 7 illustrates an implementation of circuits integral with those of FIGS. 3A–3D, for generating the white and black shading error signals and the gamma error signals. The resulting spatial, shading and gamma error correction signals provide the video picture total raster scan correction.

To this end, the measured and reference channel low passed video signals from the low pass filters 112, 114, respectively, of FIG. 3A, are supplied via lines 306, 308 to the inputs of measured and reference channels of the black/white shading error correction circuits of FIG. 7. The measured and reference channels employ identical circuits as shown. Thus, the video signals on lines 306, 308 are fed to buffer amplifiers 310, 312, respectively. The outputs thereof are introduced to negative amplifiers 314, 316, as well as to positive peak detectors 318, 320, respectively. The detector 320 is exemplified in detail as a peak detector circuit coupled to a buffer circuit. The amplifiers 310, 312 have a gain of one and provide positive measured and reference channel video signals, and the amplifiers 314, 316 have a gain of negative one and provide negative measured and reference channel video signals. The negative video signals are fed to positive peak detectors 324, 326, respectively. The peak detectors 318, 324, 326 are identical to detector 320, and thus are not shown in detail. The peak detectors 318, 320 detect the peaks of the positive video to define the white video signal level, i.e., produce a D.C. waveform corresponding to the white level envelope. The detectors 324, 326 detect the positive peaks of the negative video (since the video signal has been inverted) to define the video signal black level, i.e., to produce a D.C. waveform of the same polarity which corresponds to the black level envelope. The video signal is inverted to allow the use of four positive peak detectors, thereby simplifying the circuit.

The outputs of the peak detectors 318, 320 are fed to the negative and positive inputs, respectively, of a differential amplifier 330. The outputs of the peak detectors 324, 326 are fed to the negative and positive inputs, respectively, of a differential amplifier 332. The differential amplifiers compare the reference peak D.C. black/white levels with the respective measured peak D.C. black/white levels, to thereby supply the difference in the black and the white levels to the analog data select switch 62 of previous mention in FIG. 2. Switch 62 supplies the black or white shading errors in response to the box select command on line 181, to the sample/hold circuit 64 and A/D converter 60 and thence to a shading error data bus 334 corresponding to the common data buses 176, 270 and 65 (FIG. 2) of previous mention. Components 60–64 are under the control of the CCU microprocessor system 30 as shown in FIG. 2, whereby the black and white shading error signals from differential amplifiers 332, 330, are supplied for subsequent encoding, multiplexing and transmission to the camera head system 12. Thus, the output of the A/D convertor 60 is the digital version of the magnitudes of the differences of the black and white D.C. level errors. Note that a single peak detector circuit and a positive/negative switch (not shown) could be used in place of the four circuits of FIG. 7 which, however, increases the amount of time required to measure the shading errors.

In FIG. 7, gamma error measurements are also provided, along with the black/white shading measurements. Thus, the output of the measured channel peak detector 324 is coupled to an input of a summing amplifier 322 via an inverter 323, and the detector 318 is coupled to the other input of the amplifier 322. The latter's output is thus the mean black/white D.C. value of the video signal, which is fed to a black/white, and a gray, capacitor 325, 327 respectively, via a switch 328. The capacitors are coupled to a differential amplifier 329. The switch 328 determines which capacitor samples the mean black/white D.C. value, in response to the measured pattern valid signal on line 138. That is, when there is a valid pattern present, the mean value of the black to white pattern is fed via the switch 328 to the black/white capacitor 325. However, in the absence of a pattern valid signal, the system is scanning in a gray area of the pattern, and the switch 328 directs the mean D.C. value to the gray capacitor 327.

Since the black level is zero and the white level is 100%, the mean D.C. level sampled by the black/white capacitor 325 is 50%. If there is no gamma correction required, the gray D.C. level sampled by the gray capacitor 327 also is 50%, i.e., is identical to the mean black/white level. However, if the sampled D.C. levels of the capacitors 325 and 327 are different due to the presence of a gamma error, the difference is detected via the differential amplifier 329. The output of the latter amplifier is the gamma error, which is then fed to the data select switch 62 for subsequent digitizing, encoding, etc., along with the black and white shading errors, in response to the CCU microprocessor 30 control. As known, gamma correction is made by integrating over the entire picture, not on a box-by-box basis. Also gamma correction is made relative to each tube in the camera head, not between tubes as in spatial corrections.

FIG. 8 illustrates one circuit means for generating the electronic test pattern of previous mention, which appears at the output 58 of the circuit, and which corresponds to the ETP input 58 of FIG. 3A. A 500 kHz input to FIG. 8 on a line 336 supplies the electronic test pattern frequency desired from the microprocessor system 30 (FIG. 2), to a switch 338 and an invertor 340. The switch and inverter provide a 180 degree shift in the black and white areas of the test pattern to provide the vertical information. Switching is in response to an ETP address vertical rate signal on inputs 342 at a 2 kHz rate. The switched pattern is fed to a second switch 344 which is also controlled by the ETP address vertical rate signal, to provide switching between the black and white pattern and a gray level generator at 346, wherein the latter is used for gamma correction purposes. The resulting electronic test pattern signal on output 58 provides the electronic version of the optical test pattern 38 of FIGS. 1, 2.

FIG. 9 depicts an example of an interface circuit between the CCU microprocessor system 30, and the error measurement circuit 54, the A/D convertor 60, etc., depicted in FIG. 2 and shown in further detail in the FIGS. 3B, 3D and 7. The various inputs/outputs are similarly labeled and numbered. Thus the common data bus 65, i.e., buses 176, 270, 334, are coupled to the microprocessor system 30 via the bi-directional bus 67, and thence to the encoder/mux/demux/decoder means 28 via a latch 347. A read/write and an H and V data bus select signal on lines 349 provide control of the interface and of the error data generated by the error measurement circuit 54, via the various outputs and the controls of microprocessor system 30.

FIGS. 10 and 11 illustrate a sync generator circuit and the associated interface therefor, respectively, and show the various pertinent inputs and outputs between the microprocessor system 32 and the total raster error corrector means 34 (FIGS. 2, 6). The sync generator of FIG. 10 is generally defined by counters, a read-only memory, latches, etc., and generates the various V and H addresses and timing control signals, which are applied to the error corrector circuits 74–96 via the interface circuit of FIG. 11. Thus the V and H addresses are introduced to the interface circuit of FIG. 11 via lines 348, 350 respectively. The various blanking and reset signals, and various higher order address frequency signals, are introduced to the interface circuit via lines 352, 354, respectively. The horizontal and vertical addresses on lines 348, 350, from the sync generator of FIG. 10, and the error correction means update information on an address bus 356 from the microprocessor system 32, are alternately passed to the address output line 275 via a quad switcher 358 in response to the 250 kHz input to FIG. 11 on the line 354.

Channel control data which ultimately determines the positioning of the video selector switch 56 via line 109 (FIG. 3A), is introduced on a data bus 360 from the microprocessor system 32, while the error data from the microprocessor system 32 is supplied to data bus 362 of the interface circuit of FIG. 11. The data on bus 362 is bi-directional to output data line 273 (FIG. 6), wherein the read/write operations for the memories 280 are controlled by inputs 364 and bi-directional switches 366, and the bus control signal of the line 278 via a flip-flop 368. The zero fill (via a flip-flop 370) store, carry reset, and the chip select (CS) commands of previous mention, (FIG. 6), are applied to the error corrector circuits 74–96 via the lines 295 and 361. The switch 300 is controlled via the blanking signal on line 304. Serial arithmetic timing signals are provided to the adder 284 of FIG. 6 via various gates and the output line 295 in FIG. 11 in response to the timing signals on the line 354 of the FIGS. 10, 11.

The flow charts depicting the basic routine, as well as various subroutines within the basic routine, are shown in FIGS. 12-19, and illustrate the procedure for the fully automatic setup of a television camera complete with spatial and shading error correction. The routines depict additional automatic setup procedures such as for example, iris, focus, flare, gamma correction, etc., as well as the spatial and black and white error correction in accordance with the invention.

The basic automatic setup routine is shown in FIGS. 12A, 12B, and is generally self-explanatory. Thus the first three blocks are concerned with selection of a single, or one of a multiple of cameras, as well as to prevent operation of the automatic setup in case the camera is "on air".

To this end, following the flow chart in FIG. 12A, the absolute black subroutine of FIG. 14 is performed, followed by the auto-black/auto-white/auto-gamma subroutine of FIG. 15. Next the test "was selection auto black" is made, whereby if the auto-black subroutine was previously requested, the routine proceeds to the end of the automatic setup routine of FIG. 12B. If the selection was not only auto-black, the routine proceeds next to the limit subroutine of FIG. 13.

If the limit subroutine is successful, the routine proceeds to the auto-black/auto-white/auto-gama subroutine of FIG. 15, which is performed with the camera lens uncapped thereby providing an auto-white setup procedure. At the end of the latter subroutine, the camera is completely setup in front of the test pattern, and the system is ready to operate.

In FIG. 12B, the next test "was a fully automatic setup requested" is made. If the answer is no, the routine proceeds down the left-hand side of the flow chart, whereby each of various test requests are sequentially made. If the answer is yes, the routine performs the particular test requested, as shown down the middle of the flow chart. If none of the various tests were previously requested, the routine continues down the right side of the flow chart to the end of the routine.

However, if at any point along the test requests down the left side of the flow chart of FIG. 12B the answer is yes, the routine branches to that particular test or subroutine. For example, if a complete automatic setup was requested, the routine proceeds to; the alignment/focus subroutine of FIG. 16, to the black video selector test with the camera lens capped; to the box select subroutine of FIG. 17; to the white video selector test with the camera lens uncapped; back to the box select subroutine of FIG. 17; to the phase demodulator selector test (which is the horizontal and vertical scan correction measurement); back again to the box select subroutine of FIG. 17; to the video spacing selector test; and thence, to the end of the routine via the auto-black-/auto-white/auto-gamma subroutine of FIG. 15.

Thus, depending upon the particular automatic setup procedure requested, the routine will follow the center and right-hand side of the flow chart for fully automated setup, or will follow the left-hand side of the flow chart and branch off at the particular automatic test requested previously. Upon completion of, for example, the black or white shading correction procedure, the phase demodulated selector test, etc., the routine branches to the box select subroutine, which directs the selection of the plurality of samples within a box, and for a plurality of lines within the box, to provide the spatial errors and/or the black and white shading errors in accordance with the previous description.

When errors are generated via the subroutines, they are stored as previously described. The errors are then retrieved in the subroutine depicted near the end of the routine of FIG. 12B, whereupon the camera is then restored to normal operation in the subsequent subroutine, and the errors may be displayed.

The subroutines of FIGS. 13-19 are also generally self-explanatory. FIG. 13 depicts the limit subroutine, which is performed only once in the routine of FIGS. 12A-12B, and which insures that the test pattern is properly framed in front of the camera, with reasonable accuracy both horizontally and vertically, and that there is sufficient light on the pattern to perform the various subroutine tests. If the pattern isn't properly positioned or if there is insufficient light, the limit subroutine will indicate what was wrong on a selected printed statement, and the process will proceed to the end of the subroutine.

The limit subroutine is initiated by setting the video selector (i.e., the video selector switch 56 of FIG. 2) preferably to select n=1, corresponding to the green channel, whereby the test is made to determine that the test pattern is properly oriented and that there is sufficient light. The horizontal and vertical positions are tested and, if either of the tests is no, the subroutine prints out the statement that the chart is "out of limits". If the tests are yes, the flow chart proceeds to various iris, white flag, etc., steps not pertinent to the invention combination of spatial and shading error correction. In general, however, the lens iris must be at a mid-setting to allow acceptable light on the test pattern whereby the spatial and shading error measurements may be made. Then the test is made "is lens within limits" and, if true, the test "measured peak video level" is made. If video is within limits, the test is made "did all tests indicate yes" and, if yes, the iris is frozen in position and the manual controls are locked out such that they cannot be changed during the continuing automatic setup. The limit subroutine is then ended.

In the absolute black measurement subroutine of FIG. 14, the manual controls are locked out, and the camera lens is electrically capped. The test "select video detector number" determines the selection of the black shading process, whereupon the addresses for black level are generated. Next the video selector subroutine of FIG. 18 is performed, which sequentially selects the video selector switch positions to compare the green channel to the test pattern reference channel, and then compare red and blue channels sequentially against the green channel. The absolute black level is measured during the comparisons. If flare correction was requested, the camera is uncapped and flare is corrected to end the subroutine of FIG. 14.

The auto-black/auto-white/auto-gamma subroutine of FIG. 15 provides an auto-black step if the camera is capped, or an auto white step if the camera is uncapped. Pertinent addresses are generated in either case after the request "select video detector number", which first selects the green channel. In either the auto-black, or auto-white procedure, the video selector subroutine of FIG. 18 is then employed and the black or white shading error data for the green, red and blue channels are obtained.

The alignment/focus subroutine of FIG. 16 provides measurements of alignment at the center of the boxes in the center of the picture, and measurements of focus over the overall picture. The latter procedure is not pertinent to the invention combination, however, must be performed for total automatic setup of the television camera, and is generally self-explanatory.

The box select subroutine of FIG. 17 is used a plurality of times during various subroutines of the basic routine, to provide consecutive selection of each box of the array of boxes as previously described. The boxes are identified in this subroutine, by way of example only, as first box AA at the top left, through the last box YY at the bottom right, of the horizontal and vertical array of boxes. Thus the box select subroutine generally starts measurements with box AA corresponding to the top left-hand box of the video picture, and proceeds along the horizontal row of boxes to the last box of the first row. The measurement process continues with the second row of boxes at the left-hand side of the picture, etc., and proceeds throughout the entire array of horizontal and vertical boxes to the last row of boxes and the last box YY.

After selection of each box, the subroutine generates the corresponding address, and then proceeds to the video selector subroutine of FIG. 18. Upon finishing the video selector subroutine, an end-of-conversion signal is generated to select the next box. During the subroutine the process proceeds to the test "did box location exceed YY"; and, if not, the next box is selected, the address is generated, and the video selector subroutine is again requested. The cycle continues until measurements are made in the last box YY. Then the subroutine proceeds to "select all boxes" and after a small delay, performs the test "were all boxes selected". If the answer is yes, the subroutine proceeds back to the video selection subroutine of FIG. 18 to select the next channel, i.e., red or blue channel in order to compare it to the green channel, until all three channels have been compared. After all measurements are made via all the boxes in each channel, the box select subroutine ends with the video selector subroutine.

The video selector subroutine of FIG. 18 provides the procedure for selecting one of the three channels n=1, 2 or 3, corresponding to the green, red or blue channels. Thus at the start, the video selector selects n=1, i.e., the green channel, which may be a green absolute measurement or the green channel compared to the reference channel. The test "is frame number odd" is made and, if yes, the gain of the system is set to unity by the request "set A=0 db". The addresses are generated from that frame number for green, and for the error signal. The subsequent "subtract" request provides zeros to preset the error correction system, and, if the focus procedure was not selected the "measure error" subroutine of FIG. 19 is made, which provides the absolute (initial) and the subsequent differential value errors for the spatial and black/white shading error measurement process. At the test "end of subroutine", if n is less than three, the subroutine of FIG. 18 proceeds to the next channel and performs the cycle again. Thus the subroutine proceeds through the red and blue channels via the same path shown on the left side of the flow chart.

During the subroutine, after the subtract request, the test is made "was the error within the least significant bit" and, if not, the errors and addresses are stored and used for later display.

In the measurement of absolute black, after the test "is frame number odd", if the answer is no, the gain is moved backwards and forwards by twelve db, and the change of black level between the previous and current frames is temporarily stored.

The error measurement subroutine of FIG. 19 provides for the measurements of the absolute, or initial, errors at the start of each row of boxes (horizontal absolute values) and at the top of the picture (vertical absolute values) and, thereafter, the subsequent differential errors of the picture relative to the absolute values, over a full field. The measurements are made in the CCU microprocessor system 30 via the common bus 65 and bi-directional bus 67 of FIGS. 2, 9, whereupon the absolute, and then the subsequent differential error data are supplied to the camera head microprocessor system 32 via the means 28, as previously described.

Thus the error measurement subroutine begins with the test "was black/white/spatial error correction requested". If the answer is no, the subroutine proceeds to the bottom of the flowchart. If yes, the current error value is retrieved and the test "is current value an initial value" is made. If the answer is yes, the address is generated, and the initial error value is transmitted. If no, the previous error value is retrieved, the current error value is subtracted from the previous error value, the address is generated and the resulting differential error value is transmitted. The subroutine continues through all boxes of the array for the three channels green, red and blue, to selectively provide the horizontal and vertical spatial error values, and the black and white shading error values, for each channel as selected by the video selector switch 56. The gamma error measurement is performed in the basic routine (FIG. 12B) as previously described.

In the system wherein absolute error values are measured and stored, that portion of the flow chart of FIG. 19 which deals with the measurement of differential values, is deleted.

In the schematic diagrams of FIGS. 3A–3D, 6–11, the blocks and symbols of the various integrated circuit chips are conventionally identified by the respective manufacturer's part number, and the various pins and parts thereof also are identified in conventional manner throughout the FIGURES.

We claim:

1. A total raster error correction system for correcting all raster related errors in image pickup devices in a television camera, wherein the latter includes a central control unit and a remotely locatable camera head system each having respective microprocessor means and sync circuit means, wherein the camera head system includes scan control means integral with the image pickup devices, and video processing means coupled to the pickup devices for generating selected video signals corresponding to a video picture, comprising the combination of;

error measurement means disposed within the central control unit and coupled to the video processing means for automatically electronically measuring the total raster errors with respect to given electronic references, and for generating digital error data commensurate with the total raster errors for subsequent storage within the camera head system; and error correction means integral with the camera head system and operatively coupled to the error measurement means, for storing the digital total raster error data, for automatically and selectively retrieving in real time the total raster errors, and for selectively supplying in real time to the scan control means and to the video processing means error correction signals indicative of the total raster errors independently of the central control unit.

2. The system of claim 1 wherein the error measurement means further includes;

means for generating an electronic test pattern reference signal in the form of a modulated square wave of a frequency within the bandwidth of the color difference signals of a broadcast color television system, and including selected minimum and maximum voltage levels corresponding to the black and white levels, respectively.

3. The system of claim 2 wherein the electronic test pattern includes a 50% voltage level corresponding to a gray level, and wherein;

said error measurement means further includes a gamma error measurement circuit integral with the black and white shading error measurement circuit for comparing the mean black/white D.C. value with the gray level to provide the gamma error; and said error correction means further includes gamma correction means integral with the camera head system microprocessor means for applying the gamma correction to the video processing means.

4. The system of claim 2 wherein;

the video picture is divided into a selected horizontal and vertical array of boxes of given sizes; and said error measurement means includes means for successively sampling the spatial and black and white shading errors a plurality of times per television line within each box, and for a plurality of lines within each box, to provide the average of the horizontal and vertical scan errors, and the black and white shading errors, with respect to the boxes.

5. The system of claim 4 wherein the error measurement means further include;

video signal selector switch means coupled to the video signal for selecting the green video signal for comparison with the electronic test pattern reference signal, and then the red and the blue video signals for comparison of each with the green video signal, the selection being in response to a reference/video select address from the control unit microprocessor means.

6. The system of claim 5 wherein the total raster related errors include, spatial errors formed of geometric scan errors within an individual pickup device, registration scan errors between pickup devices, black and white shading errors, and gamma errors wherein;

said error measurement means includes a spatial error measurement circuit for comparing the scan raster of each image pickup device with the electronic test pattern to determine spatial errors in the scan raster for digital storage; and said error correction means includes digital spatial error corrector circuits operatively coupled to the image pickup devices for supplying in real time the spatial error correction signals thereto independently of the central control unit.

7. The system of claim 6 wherein;

said error measurement means further includes a black and white shading error measurement circuit integral with the spatial error measurement circuit for comparing the video signal with the selected minimum and maximum voltage levels of the electronic test pattern, to provide black and white shading errors for digital storage; and said error correction means includes black and white digital shading error corrector circuits for supplying in real time the black and white error correction signals to the video processing means independently of the central control unit.

8. The system of claim 7 wherein said digital spatial and black and white shading error corrector circuits include;

digital memory means integral therewith for storing the spatial and the black/white shading errors in the form of digital error data; and circuit means including the camera head microprocessor means integral with the digital memory means for retrieving the digital error data and for supplying in real time analog error correction signals representative thereof to respective scan control means and to the video processing means.

9. The system of claim 8 wherein the error corrector circuits further include;

vertical interpolating means coupled to the digital memory means and including an adder and a shift register for successively accumulating error correction data corresponding to the error previously measured by the error measurement means, over a plurality of television line scans, and for continuously supplying analog error correction signals for each accumulated error correction data.

10. The system of claim 9 wherein the black and white shading error measurement circuit includes, means for successively sampling the average white video voltage level within the array of boxes and comparing same to the maximum voltage level of the electronic test pattern to provide the white shading errors.

11. The system of claim 10 further including, means for successively sampling the average black video voltage level within the array of boxes and comparing same to the minimum voltage level of the electronic test pattern to provide the black shading errors.

12. The system of claim 11 wherein means for successively sampling the average black and white video voltage levels includes;

detector means operatively coupled to the video signal via the selector switch means for generating black and white DC peak signal levels; and differential amplifier means coupled to the detector means for generating the difference between the black and white D.C. peak signal levels to provide the black and white shading error data.

13. The system of claim 12 wherein the means for successively sampling the spatial and shading errors includes;

central control unit microprocessor means operatively coupled to the error measurement means for supplying the error data together with respective addresses;

selected data channels for transmitting the data and addresses to the camera head system; and said digital memory means being responsive to the camera head microprocessor means to receive the error data and addresses for data storage and subsequent retrieval.

14. The system of claim 13 wherein the error measurement means includes;

pattern detector means for receiving the video signals and the electronic test pattern signal and for generating selected frequency and pattern valid signals;

horizontal error detector means coupled to the pattern detector means for generating the average error data for the horizontal errors in the horizontal direction of the array of boxes; and vertical error detector means coupled to the pattern detector means for generating the average error data for the vertical errors in the vertical direction of the array of boxes.

15. The system of claim 14 wherein the pattern detector means includes;

a reference channel having filters and limiter/doubler means for deriving a reference frequency signal in the form of transitions corresponding to particular timing instants of the incoming reference channel video signal;

a measured channel having filters and limiter/doubler means for deriving a measured frequency signal in the form of transitions corresponding to particular timing instants of the incoming measured channel video signal;

reference channel detector/comparator means for generating a reference pattern valid signal;

measured channel detector/comparator means for generating a measured pattern valid signal; and digital magnitude comparator means for generating box select and row select commands in response to the central control unit microprocessor means and the sync means.

16. The system of claim 15 wherein the horizontal error detector means includes;

phase detector/latch means coupled to the measured and reference frequency signals for generating a horizontal error signal over a selected plurality of sampled error values within a respective given box of the array of boxes in response to the box select command and the pattern valid signals.

17. The system of claim 16 wherein the horizontal error detector means further includes;

serial adder/accumulator means coupled to the phase detector/latch means for successively accumulating the sampled values of respective spatial errors over a selected number of lines in the box to derive average spatial error values.

18. The system of claim 16 wherein the vertical error detector means include;

delay line means coupled to the reference and measured frequency signal and responsive to a horizontal rate clock for providing delayed reference and measured frequency signals;

first gate means disposed to receive the delayed and undelayed reference frequency signals, and the delayed and undelayed measured frequency signals, respectively, and to generate respective timed reference and measured signals therefrom in response to the box select command and the reference and measured pattern valid signals;

latch means for receiving the timed reference and measured signals and for generating reference and measured vertical error related data therefrom; and second gate means coupled to the latch means and including a summing gate for receiving the reference and measured vertical error related data and for generating vertical error data therefrom indicative of the vertical spatial errors within a given box in response to the row select command.

19. An automatic correction system for correcting all raster related errors in image pickup devices of a camera head system which generates a video signal corresponding to a video picture, comprising the combination of;

optical test pattern means of alternate black and white horizontal and vertical areas corresponding to a selected pattern frequency, with selected gray areas therebetween;

error measurement means for receiving the video signal and for generating horizontal and vertical spatial error data corresponding to errors in the scans of the image pickup devices, at selected sample points within selected box areas of the video picture, and for generating black and white shading error data corresponding to errors in the video signal with relation to selected black and white video voltage levels taken from the test pattern means;

A/D convertor means coupled to the error measurement means for digitizing the resulting error data; and error correction means including digital memory/retrieval means disposed in the camera head system to receive the digitized error data for storage therein, for subsequently selectively retrieving the digital error data during camera head system operation, and for applying analog spatial error correction signals to the image pickup device scans, and black and white shading errors to the video signal, respectively.

20. The correction system of claim 19 further including electronic test pattern generating means integral with the error measurement means for generating an electronic test pattern signal corresponding to the optical test pattern means, which has perfect geometry and corresponding selected black and white video voltage levels.

21. The correction system of claim 20 wherein the error measurement means includes;

pattern detector means for receiving the selected video and electronic test pattern signals, and including video selector switch means for selectively directing the video and the test pattern signals to measured and reference channels thereof; and horizontal and vertical error detector means coupled to the pattern detector means and including respective measured and reference channels coupled to the measured and reference channels of the pattern detector means.

22. The correction system of claim 21 wherein the camera head system includes red, green and blue color channels corresponding to red, green and blue image pickup devices, respectively, wherein the error correction means includes;

digital memory/retrieval means associated with each of the red, green and blue channels and having an error corrector memory disposed to store spatial error data, and black and white shading error data, in memory locations defined by the respective addresses;

timing control means including a camera head system microprocessor means for retrieving the error data with selected re-timing commensurate with delays in the error measurement means and in subsequent integration, to obtain continuous analog error correction signals;

serial adder/shift register means coupled to the memory and responsive to the timing control means for successively adding the error data from the error corrector memory commensurate with the number of samples, and with the number of successive line scans, within each box, to generate horizontal and vertical spatial and black and white shading analog error correction signals for each of the red, green and blue color channels, respectively; and D/A converter means coupled to the serial adder/shift register means to continuously supply the spatial analog error correction signals to the image pickup devices, and the black and white shading analog error correction signals to the color channels.

23. The correction system of claim 21 further including a central control microprocessor means, wherein the pattern detector means includes;

filter means coupled to the video selector switch means in respective measured and reference channels;

limiter means coupled to the filter means in respective measured and reference channels, and providing outputs of measured and reference 2F frequency signals which are 180 degrees out of phase;

detector means coupled to respective measured and reference channel filter means in respective measured and reference channels, and providing measured and reference F frequency signals;

pattern comparator means coupled to respective measured and reference channel detector means, and providing measured and reference pattern valid signals indicative that the electronic test pattern employed in the generation of the measured and reference 2F frequency signals is present and valid; and digital magnitude comparator means for generating box select and row select commands in response to the central control microprocessor means.

24. The correction system of claim 23 wherein the horizontal error detector means includes;

capacitor means coupled to the measured and reference 2F frequency signals from the pattern detector means;

phase detector/latch means integral with the capacitor means and responsive to the measured and reference pattern valid signals to allow the capacitor to charge during a selected number of error samples within a specific box in response to the box select command;

A/D convertor means coupled to the capacitor means to obtain a digital magnitude corresponding to the charge on the capacitor means after the plural samples of each line of a box are measured;

adder means operatively coupled to the A/D convertor means and responsive to each digital voltage derived from the A/D convertor means to add a selected number of the successive error samples during corresponding successive line scans within the specific box, to provide the horizontal scan error data averaged out over the plurality of successive samples and lines.

25. The correction system of claim 23 wherein the vertical error detector means include;

delay line means coupled to the measured and reference F frequency signals, respectively, for providing undelayed and delayed measured and reference F frequency signals in response to the pattern valid signals;

measured and reference gate means coupled to respective measured and reference delay line means and receiving also the undelayed F frequency signals, for generating measured and reference data outputs indicative of any vertical scan errors within the specific box;

latch means operatively coupled to respective measured and reference gate means for generating measured and reference pulses indicative of the vertical scan errors in response to the box select command; and slicer means coupled to respective latch means for generating measured and reference output pulses whose relative time of occurrence corresponds to the vertical scan errors.

26. The correction system of claim 23 further including;

measured and reference amplifier/detector means coupled to the measured and reference filter means respectively of the pattern detector means for generating black measured and reference, and white measured and reference, D.C. peak signal levels; and measured and reference differential amplifier means, each coupled to the measured and reference amplifier/detector means, for generating the difference between the black measured and reference D.C. signal levels, and the white measured and reference D.C. signal levels, in response to the box select command, to provide the black and white shading error data.

27. The correction system of claim 26 wherein the electronic test pattern includes a 50% voltage level corresponding to a gray level, further including;

level sampling means operatively coupled to the measured and reference amplifier/detector means for sampling the mean black/white D.C. level and the gray level, in response to the presence and absence, respectively, of the measured pattern valid signal; and differential amplifier means for detecting a difference in the mean black/white level and the gray level definitive of the gamma error.

28. A method for selectively and automatically correcting; raster related spatial errors in and between the green, red and blue scans of respective image pickup devices in a television camera head system which generates a video signal commensurate with a video picture; black and white video signal levels; and gamma errors in the image pickup devices, comprising the steps of;

comparing the positions of the scans at selected points within specified boxes of a box array corresponding to the video picture of an optical test pattern, against an electronic test pattern signal of given black and white D.C. voltage levels related in turn to the video picture;

generating spatial error data corresponding to the horizontal and vertical positional errors at selected sample points within each box, and during selected lines within the box;

digitally storing the spatial error data in the camera head system;

retrieving the digitally stored spatial error data during real time camera head operation with selected timing relative to the positions of the errors within the box array when the errors were detected during the error measurement process; and applying analog error correction signals corresponding to the retrieved digital spatial error data to the image pickup devices, respectively, to correct any detected spatial errors.

29. The method of claim 28 wherein the steps of comparing the scans and the black and white voltage levels, includes the steps of;

selecting the green image pickup tube output for comparison with the electronic test pattern; and thereafter selecting the red, and then the blue, image pickup tube outputs for respective comparison with the green pickup tube output.

30. The method of claim 29 further including a gray voltage level in the electronic test pattern signal, and including the steps of;

deriving a mean black and white D.C. value corresponding to the gamma values of each image pickup device;

comparing the mean black and white D.C. value with the gray voltage level to derive the gamma error data;

digitally storing the gamma error data in the camera head system; and retrieving the gamma error data during real time camera head operation to correct the gamma errors of the respective pickup devices.

31. The method of claim 29 wherein the step of comparing the positions of the scans includes the steps of;

dividing the picture area into a selected array of horizontal and vertical boxes;

generating the electronic test pattern as a modulated square wave of a frequency within the bandwidth of the color difference signals of a broadcast color television signal; and comparing the green device scan at selected points within the boxes with the test pattern modulated square wave; and thereafter sequentially comparing the red and then the blue device scans with the green device.

32. The method of claim 31 further including the steps of;

comparing the video signal voltage levels with the black and white areas of the electronic test pattern with the camera lens capped and uncapped, respectively, to provide black and white shading error data;

digitally storing the black and white shading error data in the camera head system;

retrieving the digitally stored shading error data during real time camera head operation with selected timing relative to the time within the box array when the errors were detected during the error measurement process; and applying analog error correction signals corresponding to the retrieved digital shading error data to the video signal to correct any detected shading errors.

33. The method of claim 32 wherein the step of comparing the video signal voltage levels includes the step of;

comparing the video black and white voltage levels over the picture of each image pickup device to provide averaging of the black and white shading error data of each pickup device.

34. The method of claim 33 wherein the steps of digitally storing the resulting spatial and black and white shading error data includes the steps of;

digitizing the spatial and black and white shading error data;

generating addresses for the error data; and transmitting the digitized data and addresses to the camera head system for data storage therein.

35. The method of claim 34 wherein the step of generating the spatial and black and white shading error data includes the steps of;

generating the absolute horizontal spatial error values at the start of the first box in a row of boxes and the absolute vertical spatial error values at the start of the top boxes of the picture; and generating the differential error values during periods following the respective absolute spatial error values relative to the boxes of the box array.

36. The method of claim 35 wherein the step of retrieving the digitally stored spatial error data further includes the step of;

interpolating by integration in real time the differential errors between measured points of the boxes as the latter are being retrieved from storage.

37. The method of claim 34 wherein the step of generating the spatial and black and white shading error data includes the step of;

generating the absolute error values for all samples taken in the boxes in the box array for subsequent digitizing, transmission and storage in the camera head system.

38. The method of claim 34 wherein the step of retrieving includes the steps of;

locating the addresses of the stored digital spatial and black and white shading error data;

retrieving the stored digital error data with re-timing commensurate with the delays caused by the error measurement process and the subsequent integration process; and converting the retrieved digital error data to analog error correction signals.

39. The method of claim 38 wherein the step of applying includes the steps of;

supplying the analog spatial error correction signals to the respective pickup device scans to correct the spatial errors therein; and supplying the analog black and white shading error correction signals to the respective color signals to correct the black and white video signal levels of each image pickup device.

* * * * *